(12) United States Patent
Kawahito et al.

(10) Patent No.: US 7,706,132 B2
(45) Date of Patent: Apr. 27, 2010

(54) SOLID ELECTROLYTIC CAPACITOR

(75) Inventors: Kazuo Kawahito, Osaka (JP); Minoru Oomori, Kyoto (JP); Junichi Kurita, Osaka (JP); Masatoshi Tasei, Kyoto (JP); Masato Ozawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/475,898

(22) Filed: Jun. 1, 2009

(65) Prior Publication Data
US 2009/0296318 A1 Dec. 3, 2009

(30) Foreign Application Priority Data
Jun. 2, 2008 (JP) ............................. 2008-144467
Jun. 2, 2008 (JP) ............................. 2008-144468
Jun. 2, 2008 (JP) ............................. 2008-144469

(51) Int. Cl.
H01G 9/00 (2006.01)
(52) U.S. Cl. .................. 361/523; 361/525; 361/528; 361/529; 361/516; 361/519
(58) Field of Classification Search .............. 361/523, 361/516–519, 525–528, 529–541; 29/25.01, 29/25.03
See application file for complete search history.

(56) References Cited

U.S. PATENT DOCUMENTS

| | | | | |
|---|---|---|---|---|
| 5,377,073 A * | 12/1994 | Fukaumi et al. | ............ | 361/540 |
| 6,343,004 B1 * | 1/2002 | Kuranuki et al. | ............ | 361/523 |
| 6,392,869 B2 * | 5/2002 | Shiraishi et al. | ............ | 361/523 |
| 6,535,375 B1 * | 3/2003 | Jung et al. | ............ | 361/523 |
| 6,808,541 B2 * | 10/2004 | Maeda | ............ | 29/25.03 |
| 6,816,358 B2 * | 11/2004 | Kida et al. | ............ | 361/540 |
| 6,891,716 B2 * | 5/2005 | Maier et al. | ............ | 361/523 |
| 6,903,922 B2 * | 6/2005 | Sano et al. | ............ | 361/533 |
| 7,016,179 B2 * | 3/2006 | Ando | ............ | 361/523 |
| 7,394,649 B2 * | 7/2008 | Nakamura et al. | ............ | 361/523 |
| 2002/0015277 A1 | 2/2002 | Nitoh et al. | | |
| 2007/0019366 A1 | 1/2007 | Yamaguchi et al. | | |

FOREIGN PATENT DOCUMENTS

| | | |
|---|---|---|
| JP | 2001-230156 A | 8/2001 |
| JP | 2007-005760 A | 1/2007 |
| JP | 2007-035691 A | 2/2007 |

* cited by examiner

Primary Examiner—Nguyen T Ha
(74) Attorney, Agent, or Firm—Pearne & Gordon LLP

(57) ABSTRACT

A solid electrolytic capacitor includes a negative terminal, first to fourth capacitor elements coupled to the negative terminal, first and second positive terminals connected to the first to fourth capacitor elements, and a package resin covering the first to fourth capacitor elements. Each of the first to fourth capacitor elements has a first end and a second end opposite to the first end, and each of the first to fourth capacitor elements includes a negative electrode provided at the first end and a positive electrode provided at the second end. The first to fourth capacitor elements are stacked in this order. The positive electrodes of the first and fourth capacitor elements extend in a first direction from the respective negative electrodes of the first and fourth capacitor elements. The positive electrodes of the second and third capacitor elements extend in a second direction, opposite to the first direction, from the respective negative electrodes of the second and third capacitor elements. This solid electrolytic capacitor has a small leakage current.

7 Claims, 16 Drawing Sheets

SOLID ELECTROLYTIC CAPACITOR

FIELD OF THE INVENTION

The present invention relates to a solid electrolytic capacitor used in electronic devices.

BACKGROUND OF THE INVENTION

As electronic devices operate at high speeds or high frequency, solid electrolytic capacitors used for power supply lines for CPUs are demanded to have large capacitance and low impedance in order to improve noise rejection and transient response over a broad bandwidth from low frequencies to high frequencies, such as 1 MHz.

FIG. 23 is a top view of conventional capacitor element 341. FIG. 24 is a bottom view of conventional solid electrolytic capacitor 701 including capacitor element 341. FIG. 25 is a side cross-sectional view of solid electrolytic capacitor 701 at line 25-25 shown in FIG. 27.

Each capacitor element 341 has a rectangular shape, and includes a valve metal plate and separator 350 that divides the valve metal plate into positive electrode 342 and negative electrode 343. Negative electrode 343 includes a dielectric oxide layer provided on the valve metal plate, a solid electrolyte layer made of conductive polymer provided on the dielectric oxide layer, and a negative electrode layer provided on the solid electrolyte layer.

Negative electrodes 343 of plural capacitor elements 341 are stacked such that positive electrodes 342 extend alternately in opposite directions from negative electrodes 343. Positive electrodes 342 of capacitor elements 341 are stacked and welded to positive flat portion 368 of positive terminal 344. Negative electrodes 343 are bonded to negative flat portion 349 of negative terminal 345 with a conductive adhesive. Positive terminals 344 and negative terminal 345 are located on a lower surface of stacked capacitor elements 341.

Capacitor elements 341 are stacked such that positive electrodes 342 extend alternately in opposite directions from negative electrodes 343. This arrangement allows currents to flow through capacitor elements 341 adjacent to each other in directions opposite to each other, and cancels magnetic fields produced by the currents, thus providing capacitor 701 with a small equivalent series inductance (ESL).

Stacked capacitor elements 341 are covered with package resin 346 by molding, such that positive terminal 344 and negative terminal 345 are exposed closely to each other at a lower surface, mounting surface 347 of package resin 346. This structure reduces a length of a path of a current flowing between capacitor elements 341 and lands of a circuit board, accordingly reducing an equivalent series resistance (ESR) and the ESL, impedance of capacitor 701.

In solid electrolytic capacitor 701, side surfaces of negative electrodes 343 of stacked capacitor elements 341 are bonded to a negative electrode coupler provided along the side surfaces of negative electrode 343 with conductive adhesive agent.

In conventional solid electrolytic capacitor 701, capacitor elements 341 may be displaced when capacitor elements 341 are mounted to positive terminals 344 and negative terminal 345, or when stacked capacitor elements 341 are pressurized to be bonded. In this case, positive electrodes 342 of capacitor elements 341 can be connected electrically with negative terminal 345, and prevent positive terminal 344 and negative terminal 345 from being located close to each other, accordingly preventing the impedance from being small.

In conventional solid electrolytic capacitor 701, during a molding process of external resin 346, timing when melted material of external resin 346 flows inside gap 348 between positive electrodes 342 of capacitor elements 341 is different from timing when the melted material flows outside gap 348. This may cause the melted material of external resin 346 to deform positive electrodes 342 to deform by molten external resin 346, and may damage a portion of the dielectric oxide layer or the solid electrolyte layer of negative electrode 343 facing positive electrode 342, thereby increasing a leakage current.

In solid electrolytic capacitor 701, the distance between capacitor elements 341 and mounting surface 347 is small, and accordingly, a portion of external resin 348 that covers a surface of negative flat portion 349 facing mounting surface 347 is thin. The area of negative flat portion 349 covered with external resin 348 is large in order to provide a large capacitance. This structure may cause external resin 348 to be removed from a surface of negative flat portion 349 facing mounting surface 347 due to a rapid temperature change during soldering in a reflow process, thus producing a crack in the resin. This crack may allow oxygen to pass easily through it from an outside of external resin 348, hence increasing an electric resistance of the solid electrolyte layer made of conductive polymer and the ESR, impedance, of the solid electrolytic capacitor.

SUMMARY OF THE INVENTION

A solid electrolytic capacitor includes a negative terminal, first to fourth capacitor elements coupled to the negative terminal, first and second positive terminals connected to the first to fourth capacitor elements, and a package resin covering the first to fourth capacitor elements. Each of the first to fourth capacitor elements has a first end and a second end opposite to the first end, and each of the first to fourth capacitor elements includes a negative electrode provided at the first end and a positive electrode provided at the second end. The first to fourth capacitor elements are stacked in this order. The positive electrodes of the first and fourth capacitor elements extend in a first direction from the respective negative electrodes of the first and fourth capacitor elements. The positive electrodes of the second and third capacitor elements extend in a second direction, opposite to the first direction, from the respective negative electrodes of the second and third capacitor elements.

This solid electrolytic capacitor has a small leakage current.

DETAILED DESCRIPTION OF PREFERRED EMBODIMENTS

Exemplary Embodiment 1

Figure 1:
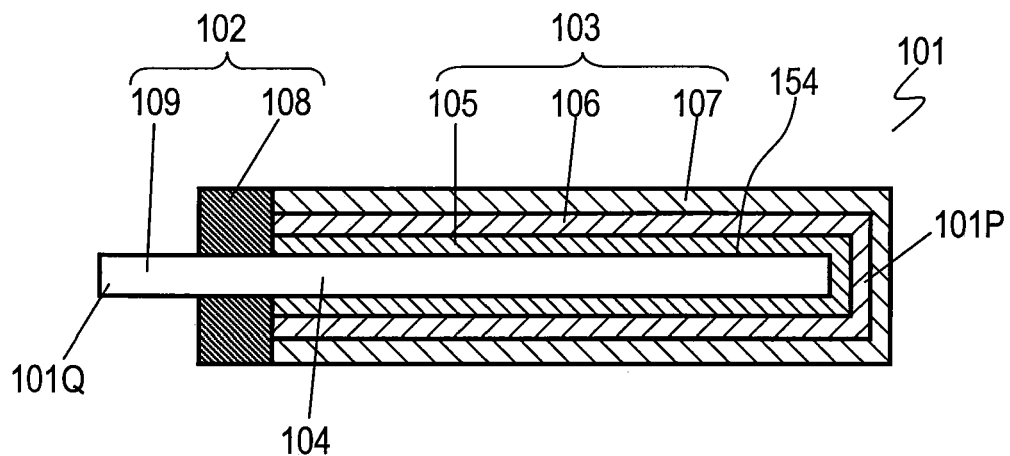
FIG. 1 is a side cross-sectional view of a capacitor element of a solid electrolytic capacitor according to Exemplary Embodiment 1 of the present invention.

FIG. 1 is a side cross-sectional view of capacitor element 101 according to Exemplary Embodiment 1. Capacitor element 101 has a flat plate shape, and includes positive electrode body 104, positive electrode 102 provided on positive electrode body 104, and negative electrode 103 provided on positive electrode body 104. Positive electrode body 104 is a foil made of valve metal, such as aluminum, tantalum, titanium, or niobium, and has surface 154. Surface 154 is roughened by etching to enlarge its surface area. Alternatively, positive electrode body 104 can include a porous sintered body provided by sintering powder of valve metal, and a valve metal strip embedded in and bonded to the porous sintered body. Negative electrode 103 is provided at end 101P of capacitor element 101. Positive electrode 102 is provided at end 101Q opposite to end 101P.

Negative electrode 103 includes dielectric oxide layer 105 formed on surface 154 of positive electrode body 104, solid electrolyte layer 106 formed on dielectric oxide layer 105, and negative electrode layer 107 formed on solid electrolyte layer 106. Dielectric oxide layer 105 is formed by anodizing surface 154 of positive electrode body 104. Solid electrolyte layer 106 is formed on a surface of dielectric oxide layer 105, and is made of material selected from the group consisting of conductive polymer, such as polypyrrole, polythiophene, or polyaniline, and inorganic semiconductor, such as manganese oxide. Negative electrode layer 107 includes a carbon layer formed on solid electrolyte layer 106, and a conductive layer formed on the carbon layer. The carbon layer is made of conductive carbon, such as graphite. The conductive layer can be formed by applying a conductive paste onto the carbon layer and hardening the paste. The conductive paste contains conductive particles made of conductive material, such as silver, and a resin, such as epoxy.

Positive electrode 102 includes separator 108 and positive connection portion 109. Separator 108 is made of insulating resin, such as polyimide resin or silicone resin, and has a strip shape on positive electrode body 104 between positive connection portion 109 and negative electrode 103. Positive connection portion 109 is an end of positive electrode body 104 that is exposed from separator 108 and negative electrode 103. Separator 108 prevents solid electrolyte layer 106 and negative electrode layer 107 from being formed on positive connection portion 109 of positive electrode body 104.

Figure 2:
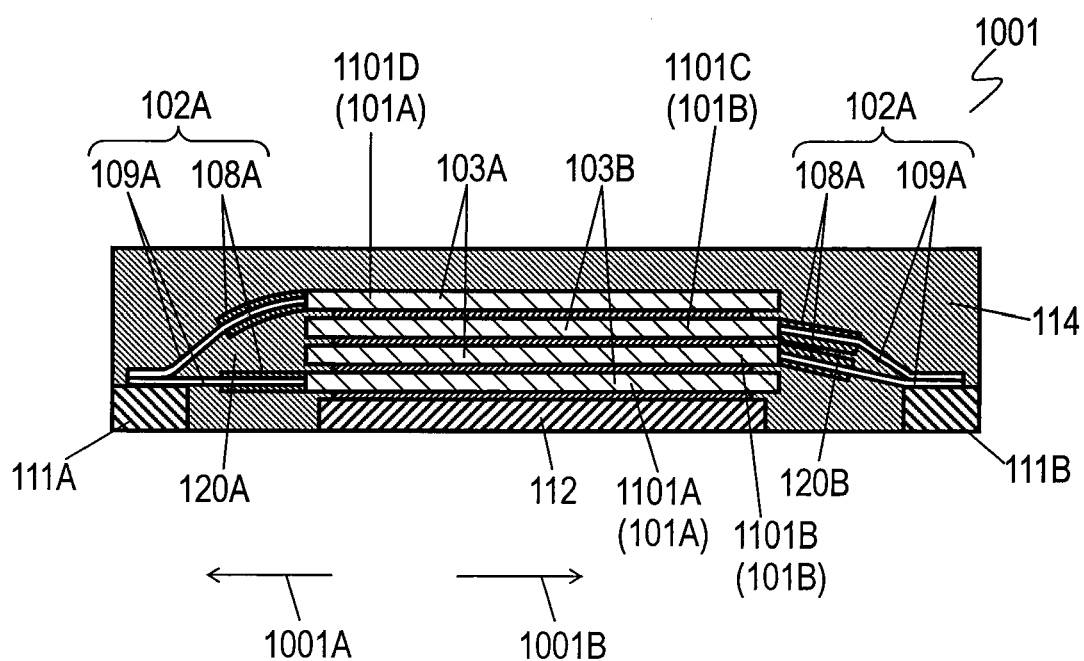
FIG. 2 is a side cross-sectional view of the solid electrolytic capacitor according to Embodiment 1.
Figure 3:
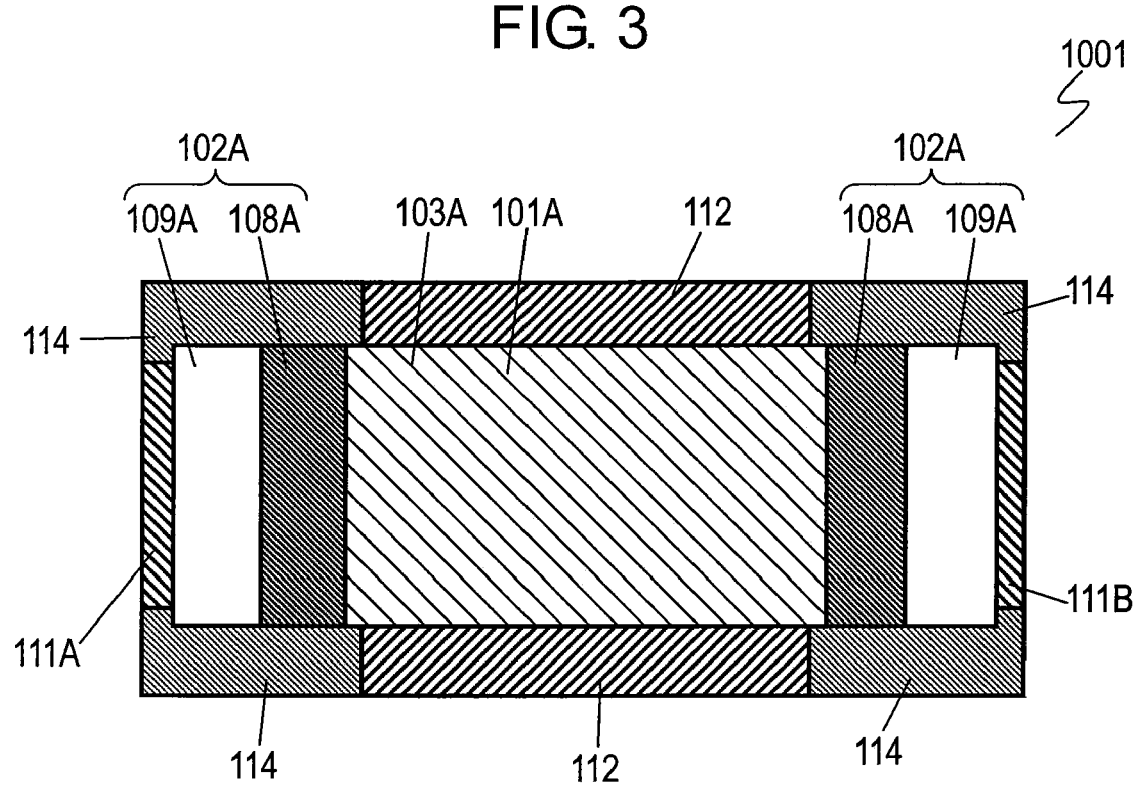
FIG. 3 is a top view of the solid electrolytic capacitor according to Embodiment 1.

FIGS. 2 and 3 are a side cross-sectional view and a top transparent view of solid electrolytic capacitor 1001 according to Embodiment, respectively. Solid electrolytic capacitor 1001 includes plural capacitor elements 101A and 101B. Capacitor elements 101A and 101B have structures identical to the structure of capacitor element 101, and have positive electrodes 102A and 102B and negative electrodes 103A and 103B, respectively. Negative electrodes 103A and 103B have structures identical to the structure of negative electrode 103 of capacitor element 101. Positive electrodes 102A and 102B have structures identical to the structure of positive electrode 102 of capacitor element 101. Positive electrodes 102A of capacitor elements 101A extend from respective negative electrodes 103A in direction 1001A. Positive electrodes 102B of capacitor elements 101B extend from respective negative electrodes 103B in direction 1001B opposite to direction 1001A.

Negative electrodes 103A and 103B are bonded to each other with conductive adhesive 113, so that capacitor elements 101A and 101B are stacked in direction 1001C perpendicular to directions 1001A and 1001B.

Each of positive electrodes 102A of capacitor elements 101A, similarly to separator 108 and positive connection portion 109 of capacitor element 101, includes separator 108A and positive connection portion 109A. At least portions of positive connection portions 109A overlap and are fixed to positive terminal 111A by welding or pressure bonding.

Each of positive electrodes 102B of capacitor element 101B, similarly to separator 108 and positive connection portion 109 of capacitor element 101, includes separator 108B and positive connection portion 109B. At least portions of positive connection portions 109B overlap and are fixed to positive terminal 111B by welding or pressure bonding.

Stacked positive connection portions 109A and 109B are located in directions 1001A and 1001B opposite to each other with respect to stacked negative electrodes 103A and 103B, respectively. Stacked negative electrodes 103A and 103B are located between stacked positive connection portions 109A and 109B.

Thus, capacitor elements 101A and 101B adjacent to each other are stacked as a pair, and cancel magnetic fields produced by currents flowing through capacitor elements 101A and 101B, thus reducing an equivalent series inductance (ESL), impedance, of solid electrolytic capacitor 1001.

In solid electrolytic capacitor 1001, at least two capacitor elements 101B located adjacent to each other are provided between two capacitor elements 101A.

Gap 120A is provided between positive electrodes 102A of two capacitor elements 101A. Gap 120A is sandwiched between separators 108A and between positive connection portions 109A. Gap 120A is larger than the sum of the wall thicknesses of negative electrodes 103B of two capacitor elements 101B.

Gap 120B provided between positive electrodes 102B of two capacitor elements 101B bonded to each other is sandwiched between separators 108B and between positive connection portions 109B.

At least portions of separators 108B that sandwich gap 120B may often contact each other, and at least portions of positive connection portions 109B may often contact each other. In other words, positive electrodes 102B may often contact each other. Thus, gap 120B is much smaller than gap 120A.

In this description, the sizes of gaps 120A and 120B are sizes in direction 1001C in which capacitor elements 101A and 101B are stacked.

Positive terminals 111A and 111B are provided under laminated positive connection portions 109A and 109B to face terminals 111A and 111B, respectively. Upper surfaces of positive terminals 111A and 111B are bonded to positive connection portions 109A and 109B, respectively, by welding, such as resistance welding, ultrasonic welding, or laser welding.

Negative terminal 112 is located at a center between positive terminals 111A and 111B and under laminated negative electrodes 103A and 103B to face negative electrodes 103A and 103B. An upper surface of negative terminal 112 is bonded to negative electrode 103A with conductive adhesive 113.

Package resin 114 covers positive terminals 111A and 111B, a portion of negative terminal 112, and capacitor elements 101A and 101B. Positive terminals 111A and 111B and negative terminal 112 extend downward from a lower surface of a laminated body including stacked capacitor elements 101A and 101B, and exposed at lower surface 115 that constitutes a mounting surface of package resin 114. Surfaces of positive terminals 111A and 111B and negative terminal 112 that are exposed at lower surface 115 can be coated with metallic film, such as Sn film, in order to facilitate to be bonded to a circuit board.

As described above, as positive terminals 111A and 111B and negative terminal 112 are bonded to the lower surface of the laminated body of capacitor elements 101A and 101B, and extend directly to lower surface 115 of package resin 114. This structure reduces a distance of a path in which currents flowing between capacitor elements 101A and 101B and a land of the circuit board, accordingly reducing the ESL, the impedance.

Package resin 114 contains insulating resin, such as an epoxy resin or a phenol resin, and inorganic particles, such as silica.

After stacked capacitor elements 101A and 101B are bonded to positive terminals 111A and 111B and negative terminal 112, melted resin material is pressure-injected into a mold that accommodates capacitor elements 101A and 101B, and hardened to form package resin 114.

Next, an effect of the melted resin material of package resin 114 to capacitor elements 101A and 101B will be described below.

Gap 120A between two capacitor elements 101A is greater than the sum of wall thicknesses of negative electrodes 103B of two capacitor elements 101B. The melted resin material of package resin 114 easily flows into gap 120A. The resin material flows along a surface of positive electrode 102A facing gap 120A and a surface of positive electrode 102A opposite to gap 120A simultaneously. The melted resin material applies the same pressure onto the upper and lower surfaces of positive electrode 102A, hence preventing positive electrode 102A from deforming.

In solid electrolytic capacitor 1001, gap 120B between two capacitor elements 101B is negligibly small. Accordingly, the melted resin material of package resin 114 does not flow into gap 120B, but to surfaces of positive electrodes 102B opposite to gap 120B, hence applying a pressure onto the surfaces of positive electrodes 102B. However, two positive electrodes 102B that sandwich gap 120B contact each other, hence preventing positive electrodes 102B from deforming.

As described above, positive electrodes 102A and 102B of capacitor elements 101A and 101B during the forming of package resin 114 are prevented from deforming, and accordingly, reduce damages on dielectric oxide layers 105 of capacitor elements 101A and 101B, hence providing solid electrolytic capacitor 1001 with a small leakage current.

Figure 23:
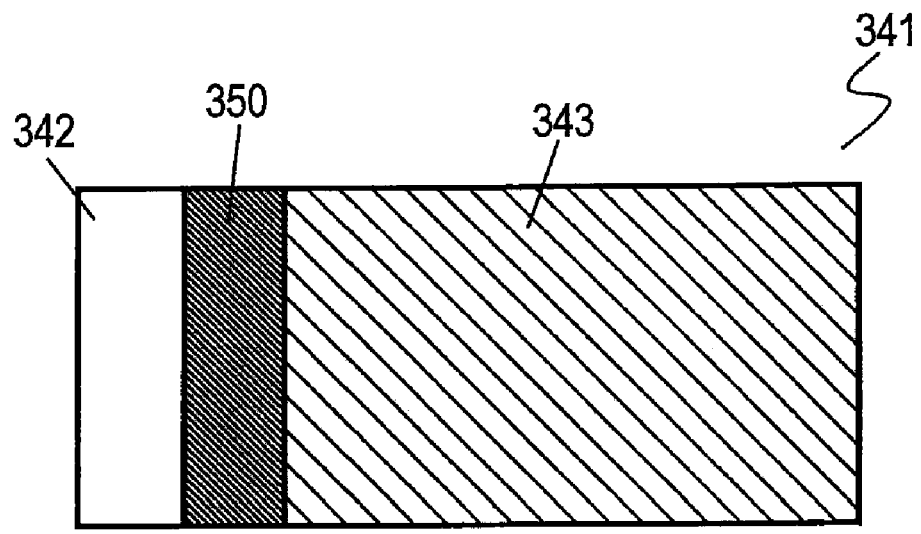
FIG. 23 is a top view of a conventional capacitor element.
Figure 24:
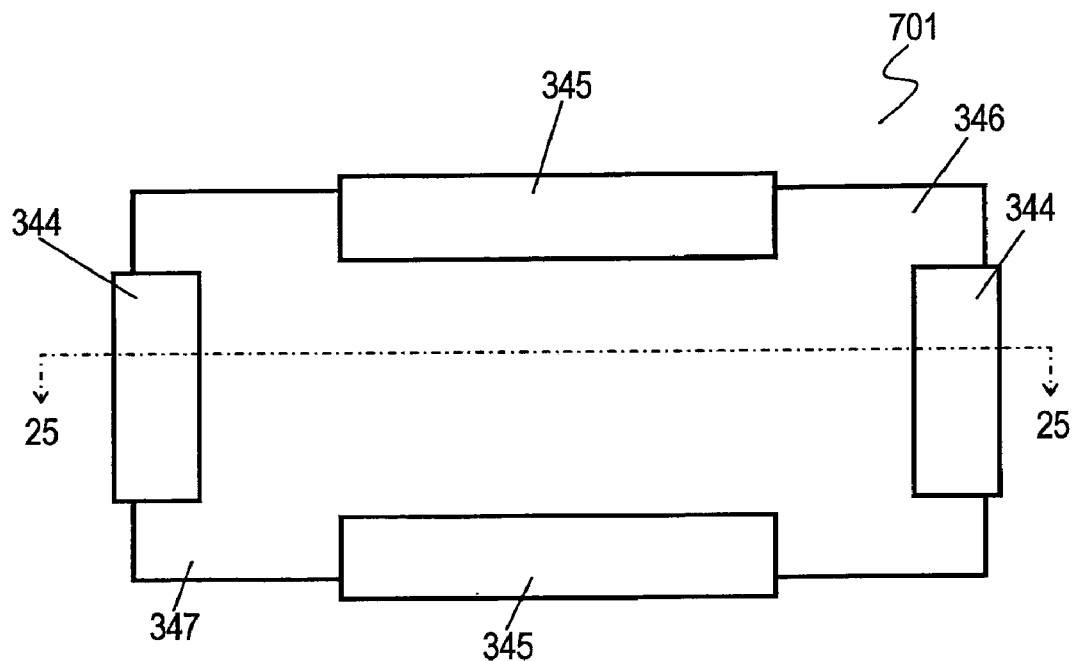
FIG. 24 is a bottom view of a conventional solid electrolytic capacitor including the capacitor element shown in FIG. 23.
Figure 25:
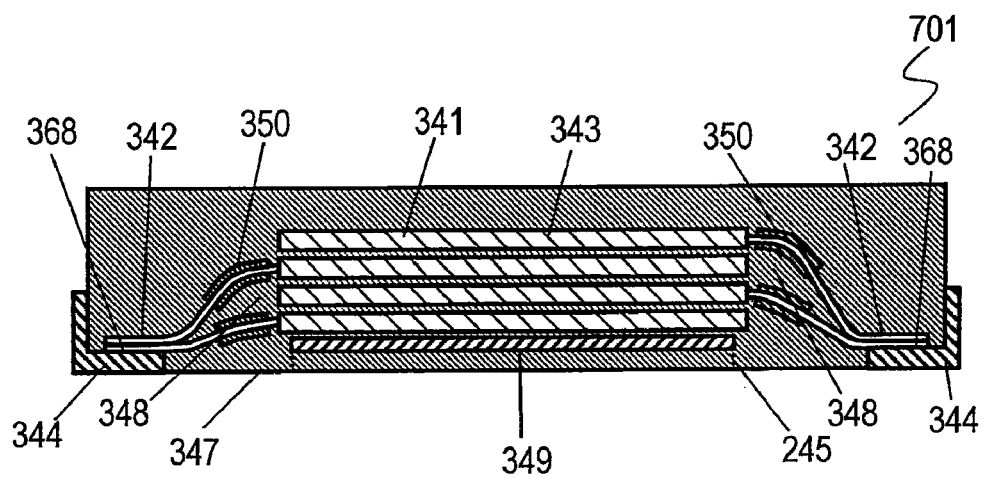
FIG. 25 is a side cross-sectional view of the solid electrolytic capacitor at line 25-25 shown in FIG. 27.

On the other hand, in conventional solid electrolytic capacitor 701 shown in FIG. 23, gap 348 between the positive electrodes of capacitor elements 341 that extend in the same direction is smaller than gap 120A of solid electrolytic capacitor 1001 shown in FIG. 2. The melted resin material of package resin 346 flows into gap 348. The resin material flows into gap 348 later than to a surface of the positive electrodes opposite to gap 348, and thus, timing when the melted resin material of package resin 346 flows in gap 348 is different from timing when the resin material flows outside gap 348. The resin material of package resin 341 to apply a pressure to positive electrodes 342 of capacitor elements 341 toward gap 348 from outside gap 348. As a result, positive electrode 342 can easily be deformed, thereby increasing the leak current of capacitor elements 341.

The number of capacitor elements 101A that are close to negative terminal 112 is preferably small, and is more preferably one. This arrangement reduces the ESL, and provides solid electrolytic capacitor 1001 with small impedance.

For example, in solid electrolytic capacitor 1001 shown in FIG. 2, single capacitor element 101A is bonded onto the upper surface of negative terminal 112, and at least a pair of capacitor elements 101B that are bonded to each other are stacked on capacitor element 101A. That is, capacitor element 1101A that is bonded onto the upper surface of negative terminal 112 is capacitor element 101A. Capacitor element 1101B that is bonded onto an upper surface of capacitor element 1101A is capacitor element 101B. Capacitor element 1101C that is bonded onto an upper surface of capacitor element 1101B is capacitor element 101B. Capacitor element 1101D that is bonded onto an upper surface of capacitor element 1101C is capacitor element 101A. This configuration reduces the ESL of capacitor 1001.

Examples 1 to 4

Solid electrolytic capacitors each including six capacitor elements 101 according to Embodiment 1 were manufactured as Examples 1 to 4. Negative electrodes 103 of capacitor elements 101 were stacked and bonded with conductive adhesive 113, and mounted on positive terminals 111A and 111B and negative terminal 112. The positive connection portions overlapped and were welded to positive terminals 111A and 111B. The negative electrodes of the capacitor elements were bonded to negative terminal 112 with conductive adhesive 113.

Then, stacked capacitor elements 101, positive terminals 111A, and 111B and negative terminal 112 were accommodated in a mold. Pellets of epoxy resin containing 80-90% by weight of silica having an average particle diameter of 60-80 µm were prepared. The pellets were melted at a temperature of 160-180° C. to be injected into the mold, and hardened to form package resin 114 by transfer molding. Thus, Examples 1 to 4 of the solid electrolytic capacitors with a rated voltage of 2 V and a capacitance of 220 µF were manufactured.

Figure 4A:
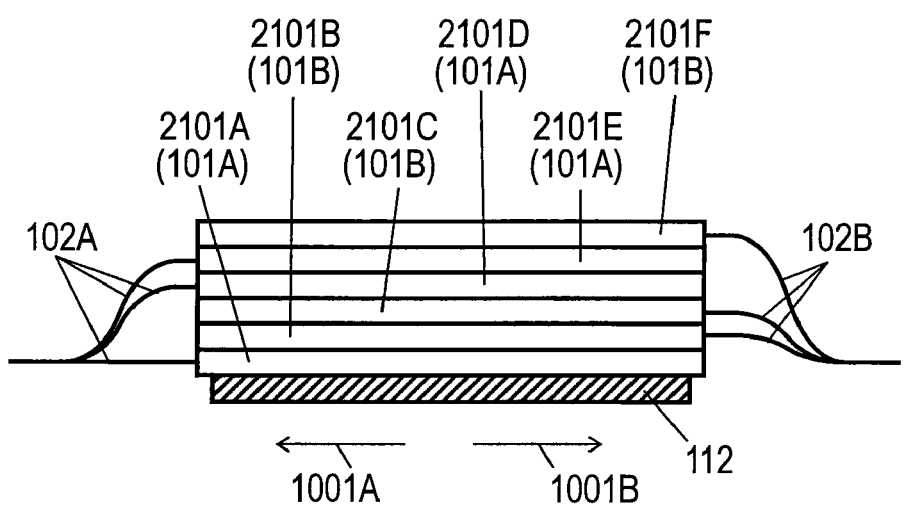
FIGS. 4A to 4D are schematic diagrams of capacitor elements of the solid electrolytic capacitor according to Embodiment 1.

FIG. 4A is a schematic diagram of capacitor elements of Example 1 of the solid electrolytic capacitor. Capacitor element 2101A bonded onto the upper surface of negative terminal 112 was capacitor element 101A. Capacitor element 2101B bonded onto an upper surface of capacitor element 2101A was capacitor element 101B. Capacitor element 2101C bonded onto an upper surface of capacitor element 2101B was capacitor element 101B. Capacitor element 2101D bonded onto an upper surface of capacitor element 2101C was capacitor element 101A. Capacitor element 2101E bonded onto an upper surface of capacitor element 2101D was capacitor element 101A. Capacitor element 2101F bonded onto an upper surface of capacitor element 2101E was capacitor element 101B.

That is, in Example 1 of the solid electrolytic capacitor shown in FIG. 4A, the negative electrode of capacitor element 2101A (101A) was coupled to the upper surface of negative terminal 112. The negative electrode of capacitor element 2101B (101B) was bonded to an upper surface of the negative electrode of capacitor element 2101A (101A). The negative electrode of capacitor element 2101C (101B) was bonded to an upper surface of the negative electrode of capacitor element 2101B (101B). The negative electrode of capacitor element 2101D (101A) was bonded to an upper surface of the negative electrode of capacitor element 2101C (101B).

Figure 4B:
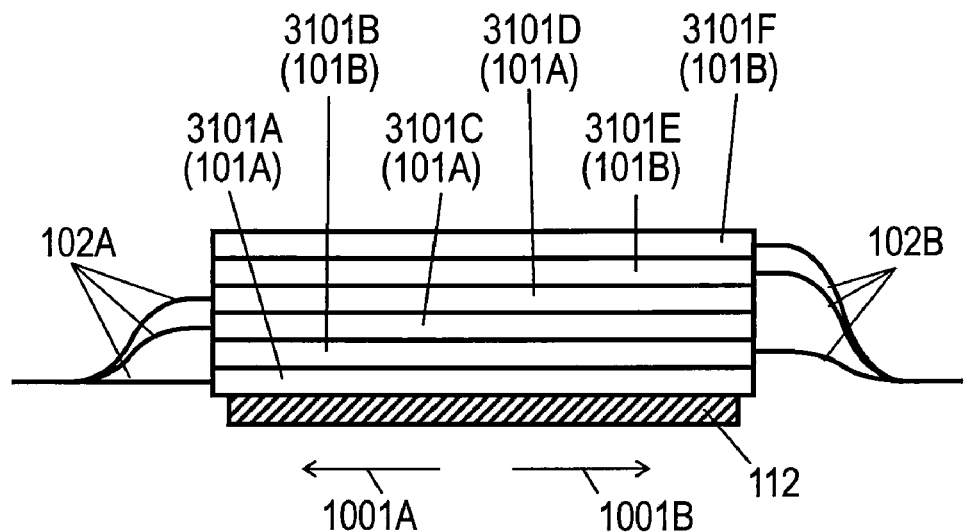

FIG. 4B is a schematic diagram of capacitor elements of Example 2 of the solid electrolytic capacitor. Capacitor element 3101A bonded on the upper surface of negative terminal 112 was capacitor element 101A. Capacitor element 3101B bonded on an upper surface of capacitor element 3101A was capacitor element 101B. Capacitor element 3101C bonded on an upper surface of capacitor element 3101B was capacitor element 101A. Capacitor element 3101D bonded on an upper surface of capacitor element 3101C was capacitor element 101A. Capacitor element 3101E bonded on an upper surface of capacitor element 3101D was capacitor element 101B. Capacitor element 3101F bonded on an upper surface of capacitor element 3101E was capacitor element 101B.

That is, in Example 2 of the solid electrolytic capacitor shown in FIG. 4B, the negative electrode of capacitor element 3101B (101B) was coupled to the upper surface of negative terminal 112 via the negative electrode layer of the negative electrode of capacitor element 3101A. The negative electrode of capacitor element 3101C (101A) was bonded to an upper surface of the negative electrode of capacitor element 3101B (101B). The negative electrode of capacitor element 3101D (101A) was bonded to an upper surface of the negative electrode of capacitor element 3101C (101A). The negative electrode of capacitor element 3101E (101B) was bonded to an upper surface of the negative electrode of capacitor element 3101D (101A).

Figure 4C:
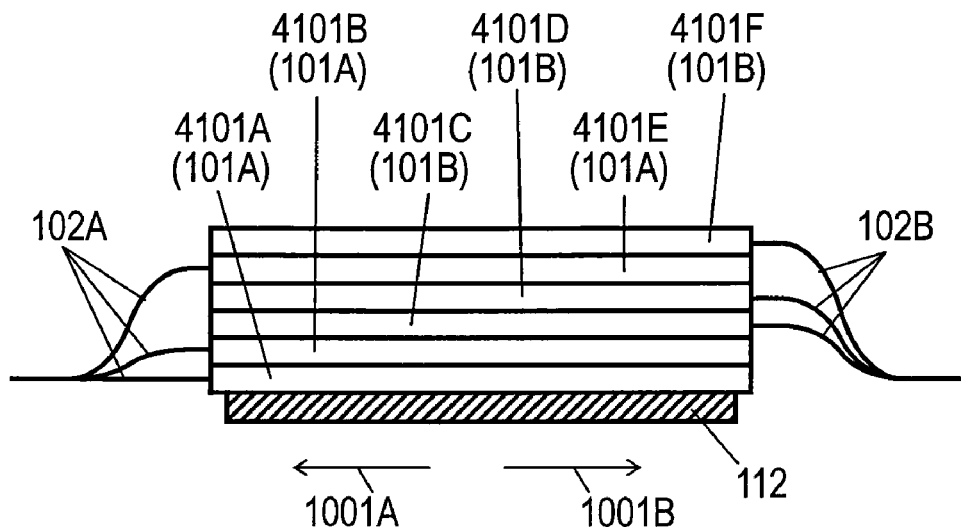

FIG. 4C is a schematic diagram of capacitor elements of Example 3 of the solid electrolytic capacitor. Capacitor element 4101A bonded on the upper surface of negative terminal 112 was capacitor element 101A. Capacitor element 4101B bonded on an upper surface of capacitor element 4101A was capacitor element 101A. Capacitor element 4101C bonded on an upper surface of capacitor element 4101B was capacitor element 101B. Capacitor element 4101D bonded on an upper surface of capacitor element 4101C was capacitor element 101B. Capacitor element 4101E bonded on an upper surface of capacitor element 4101D was capacitor element 101A. Capacitor element 4101F bonded on an upper surface of capacitor element 4101E was capacitor element 101B.

That is, in Example 3 of the solid electrolytic capacitor shown in FIG. 4C, the negative electrode of capacitor element 4101B (101A) was coupled to the upper surface of negative terminal 112 via the negative electrode layer of the negative electrode of capacitor element 4101A. The negative electrode of capacitor element 4101C (101B) was bonded to an upper surface of the negative electrode of capacitor element 4101B (101A). The negative electrode of capacitor element 4101D (101B) was bonded to an upper surface of the negative electrode of capacitor element 4101C (101B). The negative electrode of capacitor element 4101E (101A) was bonded to an upper surface of the negative electrode of capacitor element 4101D (101B).

Figure 4D:
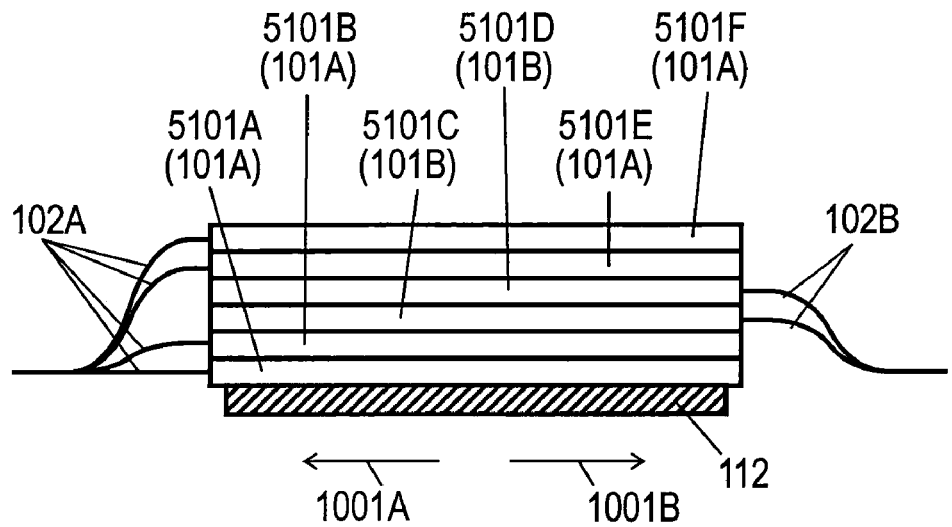

FIG. 4D is a schematic diagram of capacitor elements of example 4 of the solid electrolytic capacitor. Capacitor element 5101A bonded on the upper surface of negative terminal 112 was capacitor element 101A. Capacitor element 5101B bonded on the upper surface of capacitor element 5101A was capacitor element 101A. Capacitor element 5101C bonded on the upper surface of capacitor element 5101B was capacitor element 101B. Capacitor element 5101D bonded on the upper surface of capacitor element 5101C was capacitor element 101B. Capacitor element 5101E bonded on the upper surface of capacitor element 5101D was capacitor element 101A. Capacitor element 5101F bonded on the upper surface of capacitor element 5101E was capacitor element 101A.

That is, in Example 4 of the solid electrolytic capacitor shown in FIG. 4D, the negative electrode of capacitor element 5101B (101A) was coupled to the upper surface of negative terminal 112 via the negative electrode layer of the negative electrode of capacitor element 5101A. The negative electrode of capacitor element 5101C (101B) was bonded to an upper surface of the negative electrode of capacitor element 5101B (101A). The negative electrode of capacitor element 5101D (101B) was bonded to an upper surface of the negative electrode of capacitor element 5101C (101B). The negative electrode of capacitor element 5101E (101A) was bonded to an upper surface of the negative electrode of capacitor element 5101D (101B).

Gap 120A (FIG. 2) between the positive electrodes of the two capacitor elements that sandwiches the two adjacent capacitor elements ranged from 0.35 mm to 0.45 mm. Gap 120B (FIG. 2) between the positive electrodes of the adjacent capacitor elements ranged from 0 mm to 0.03 mm.

Comparative Example 1

Figure 4E:
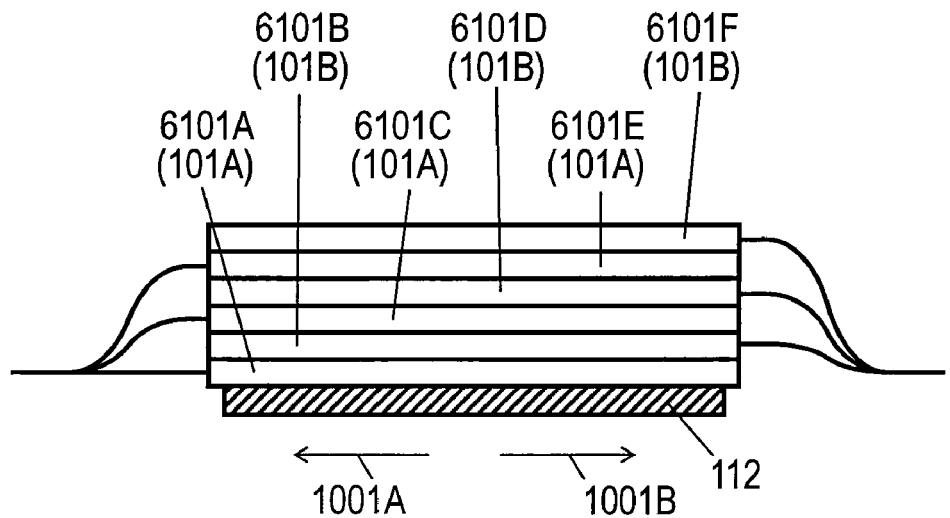
FIG. 4E is a schematic diagram of capacitor elements of a comparative example of a solid electrolytic capacitor.

Similarly to Examples 1 to 4, a solid electrolytic capacitor including six capacitor elements 101 and with the rated voltage of 2V and the capacitance of 220 µF was manufactured as a Comparative Example 1. FIG. 4E is a schematic diagram of capacitor elements of Comparative Example 1 of the solid electrolytic capacitor. Capacitor element 6101A bonded on the upper surface of negative terminal 112 was capacitor element 101A. Capacitor element 6101B bonded on the upper surface of capacitor element 6101A was capacitor element 101B. Capacitor element 6101C bonded on the upper surface of capacitor element 6101B was capacitor element 101A. Capacitor element 6101D bonded on the upper surface of capacitor element 6101C was capacitor element 101B. Capacitor element 6101E bonded on the upper surface of capacitor element 6101D was capacitor element 101A. Capacitor element 6101F bonded on the upper surface of capacitor element 6101E was capacitor element 101B. Thus, in Comparative example 1 of the solid electrolytic capacitor, three capacitor elements 101A and three capacitor elements 101B were stacked alternately.

A gap (gap 348 shown in FIG. 23) between positive electrodes 102A of capacitor element 101A of Comparative Example 1 ranged from 0.16 mm to 0.23 mm.

One hundred samples of each of Example 1 to 4 and Comparative Example 1 of the solid electrolytic capacitors were prepared. Then, a voltage of 2V, the rated voltage, was applied to each sample for one minute, and leakage currents were measured. A defective rate which was a ratio of defective samples with leakage currents greater than a predetermined value to whole samples was calculated. Further, the ESL of each sample was measured at a frequency of 500 MHz and an average of the values of the samples was calculated. Table 1 shows the defective rate and the average of the ESL of the examples.

TABLE 1

|  | Defective Rate of Leakage Current (%) | ESL (pH) |
|---|---|---|
| Example 1 | 3.5 | 76.0 |
| Example 2 | 4.7 | 76.0 |
| Example 3 | 4.5 | 78.4 |
| Example 4 | 3.3 | 78.2 |
| Comparative Example 1 | 5.3 | 76.0 |

As shown in Table 1, the defective rates of leakage current of Examples 1 to 4 of the solid electrolytic capacitors of example 1 to example 4 were is lower than the defective rate of Comparative Example 1 of the solid electrolytic capacitor.

The structure in which at least two adjacent capacitor elements 101B including positive electrodes 102B extending from negative electrodes 103B in direction 1001B between capacitor elements 101A including positive electrodes 102A extending from negative electrodes 103A in direction 1001A reduces leakage current of solid electrolytic capacitor 1001.

The ESLs of Examples 1 and 2 of the solid electrolytic capacitors were the same as the ESL of Comparative example 1 of the solid electrolytic capacitor, and were smaller than the ESLs of Examples 3 and 4 of the solid electrolytic capacitors. In Examples 1 and 2 and Comparative Example 1 of the solid electrolytic capacitors, capacitor element 2101A (3101A, 6101A) bonded on the upper surface of negative terminal 112 was capacitor element 101A, and capacitor element 2101B (3101B, 6101B) bonded on the upper surface of capacitor element 2101A (3101A, 6101A) was capacitor element 101B. On the other hand, in Examples 3 and 4 of the solid electrolytic capacitors, capacitor element 4101A (5101A) bonded on the upper surface of negative terminal 112 was capacitor element 101A, and capacitor element 4101B (5101B) bonded on the upper surface of capacitor element 4101A (5101A) was capacitor element 101A.

As described above, the structure in which capacitor element 2101A (3101A, 6101A) bonded on the upper surface of negative terminal 112 is capacitor element 101A, and capacitor element 2101B (3101B, 6101B) bonded on the upper surface of capacitor element 2101A (3101A, 6101A) is capacitor element 101B reduces the ESL, thus providing the solid electrolytic capacitor with small impedance.

Solid electrolytic capacitor 1001 according to Embodiment 1 can prevent positive electrodes 102A and 102B from deforming and reduce a leak current of capacitor element 101, hence being useful as a capacitor used for, e.g. power supply lines for CPUs.

Exemplary Embodiment 2

Figure 5:
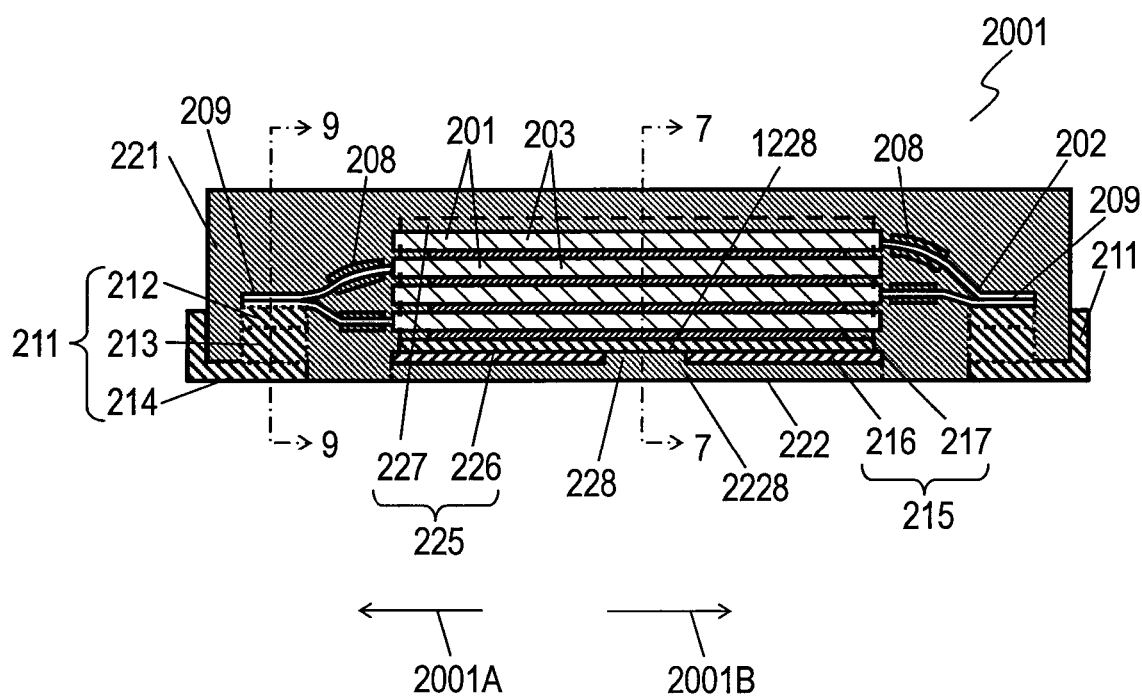
FIG. 5 is a side cross-sectional view of a solid electrolytic capacitor according to Exemplary Embodiment 2 of the invention.
Figure 6:
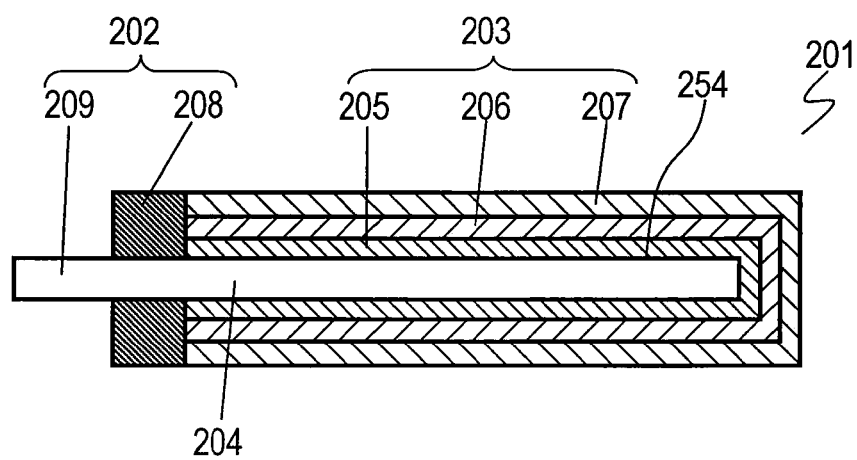
FIG. 6 is a side cross-sectional view of a capacitor element according to Embodiment 2.
Figure 7:
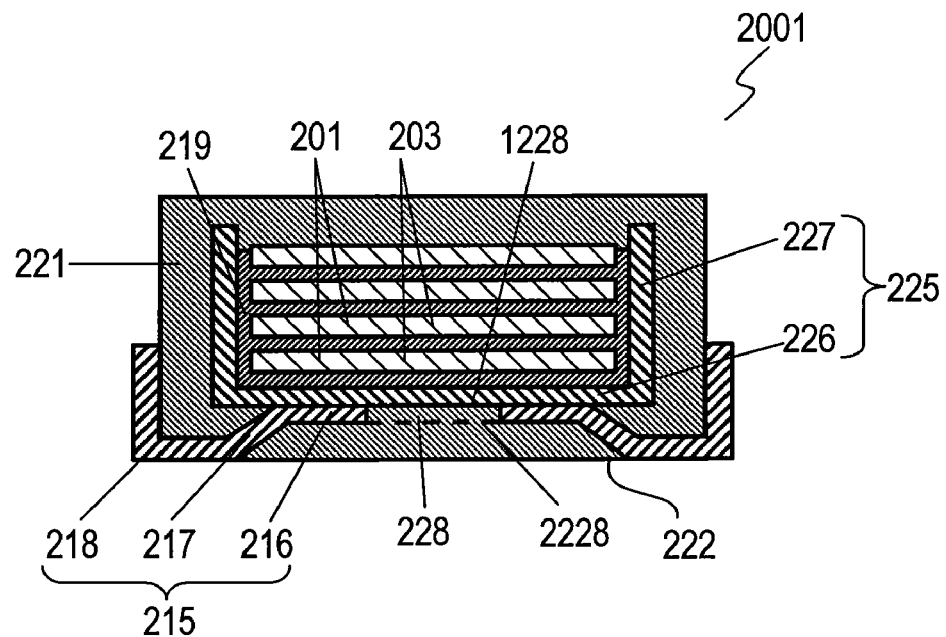
FIG. 7 is a cross-sectional view of the solid electrolytic capacitor at line 7-7 shown in FIG. 5.

FIG. 5 is a side cross-sectional view of solid electrolytic capacitor 2001 according to Exemplary Embodiment 2 of the present invention. FIG. 6 is a side cross-sectional view of capacitor elements 201 of solid electrolytic capacitor 2001. FIG. 7 is a cross-sectional view of solid electrolytic capacitor 2001 at lines 7-7 shown in FIG. 5.

The solid electrolytic capacitor includes plural capacitor elements 201 stacked, positive terminals 211, negative terminal 215, coupler 225 provided between capacitor elements 201 and negative terminal 215, and package resin 221 that covers capacitor elements 201. Each capacitor element 201 includes negative electrode 203 and positive electrode 202 extending from negative electrode 203. Each positive terminal 211 includes positive mounting portions 212 having positive electrodes 202 mounted thereon. Negative terminal 215 includes negative mounting portion 216 having negative electrode 203 mounted thereon. Coupler 225 has a cross section having a U-shape, and sandwiched between negative electrode 203 and negative mounting portion 216.

Aperture 228 is provided in negative mounting portion 216. Aperture 228 has opening 1228 facing capacitor elements 201 and opening 2228 opposite to opening 1228. Coupler 225 electrically connects negative electrode 203 with negative mounting portion 216, and closes opening 1228 of aperture 228 of negative mounting portion 216.

Capacitor elements 201 has a flat plate shape, and includes positive electrode body 204, positive electrode 202 provided on positive electrode body 204, and negative electrode 203 provided on positive electrode body 204. Positive electrode body 204 is a foil made of valve metal, such as aluminum, tantalum, titanium, or niobium, and has surface 254. Surface 254 is roughened by etching to enlarge its surface area. Alternatively, positive electrode body 204 can include a porous sintered body provided by sintering powder of valve metal, and a valve metal strip embedded in and bonded to the porous sintered body.

Negative electrode 203 includes dielectric oxide layer 205 formed on surface 254 of positive electrode body 204, solid electrolyte layer 206 formed on dielectric oxide layer 205, and negative electrode layer 207 formed on solid electrolyte layer 206. Dielectric oxide layer 205 is formed by anodizing surface 254 of positive electrode body 204. Solid electrolyte layer 206 is formed on a surface of dielectric oxide layer 205, and made of material selected from the group consisting of conductive polymer, such as polypyrrole, polythiophene, or polyaniline, and inorganic semiconductor, such as manganese oxide. Negative electrode layer 207 includes a carbon layer formed on solid electrolyte layer 206, and a conductive layer formed on the carbon layer. The carbon layer is made of conductive carbon, such as graphite. The conductive layer can be formed by applying conductive paste onto the carbon layer and hardening the paste. The conductive paste contains conductive particles made of conductive material, such as silver, and a resin, such as epoxy.

Positive electrode 202 includes separator 208 and positive connection portion 209. Separator 208 is made of insulating resin, such as polyimide resin or silicone resin, and has a strip shape on positive electrode body 204 between positive connection portion 209 and negative electrode 203. Positive connection portion 209 is an end of positive electrode body 204 that is exposed from separator 208 and negative electrode 203. Separator 208 prevents solid electrolyte layer 206 and negative electrode layer 207 from being formed on positive connection portion 209 of positive electrode body 204.

Plural capacitor elements 201 are stacked such that negative electrodes 203 of capacitor elements 201 are bonded to each other. Positive electrodes 202 of the capacitor elements 201 extend alternately in opposite directions 2001A and 2001B from negative electrode 203. Positive electrodes 202 extending in direction 2001A are stacked. Positive electrodes 202 extending in direction 2001B are stacked. Negative electrodes 203 are stacked and located at a center between stacked positive electrodes 202 at direction 2001A and stacked positive electrodes 202 at direction 2001B.

Positive terminals 211 face stacked positive electrodes 202. Negative terminal 215 faces stacked negative electrodes 203. Negative terminal 215 is located between positive terminals 211.

Package resin 221 is made of insulating resin, such as an epoxy resin, and formed by molding.

Positive terminals 211 and negative terminal 215 are metal frames made of metal, such as copper, iron, nickel, or alloy, such as Fe—Ni alloy, and preferably have a thickness of 0.07 mm to 0.3 mm.

Negative terminal 215 includes, as shown in FIGS. 5 and 7, negative mounting portion 216, negative extension portions 217, and negative exposed portions 218.

Negative mounting portion 216 has a flat shape, and is located close to and in parallel with mounting surface 222. Negative mounting portion 216 faces stacked negative electrodes 203 such that the center of stacked negative electrodes 203 faces the center of negative mounting portion 216. A distance between the surface of negative mounting portion 216 that faces mounting surface 222 and mounting surface 222 of package resin 221 ranges from half to twice the thickness of negative exposed portion 218. This distance ranges preferably from 0.05 mm to 0.15 mm, and decreases an equivalent series inductance (ESL) of solid electrolytic capacitor 2001 at high frequencies. Coupler 225 is sandwiched between negative electrode 203 and negative mounting portion 216 so as to close opening 1228 of aperture 228. Stacked negative electrodes 203 are mounted to negative mounting portion 216 via coupler 225. Further, the center of negative mounting portion 216 faces the center of a lower surface of stacked negative electrodes 203. Negative exposed portions 218 are exposed from mounting surface 222 of package resin 221 and provided on both sides of mounting surface 222, respectively. Each negative extension portion 217 is covered with package resin 221, and connected to one end of negative exposed portion 218 so as to coupe negative exposed portion 218 to negative mounting portion 216.

Figure 8:
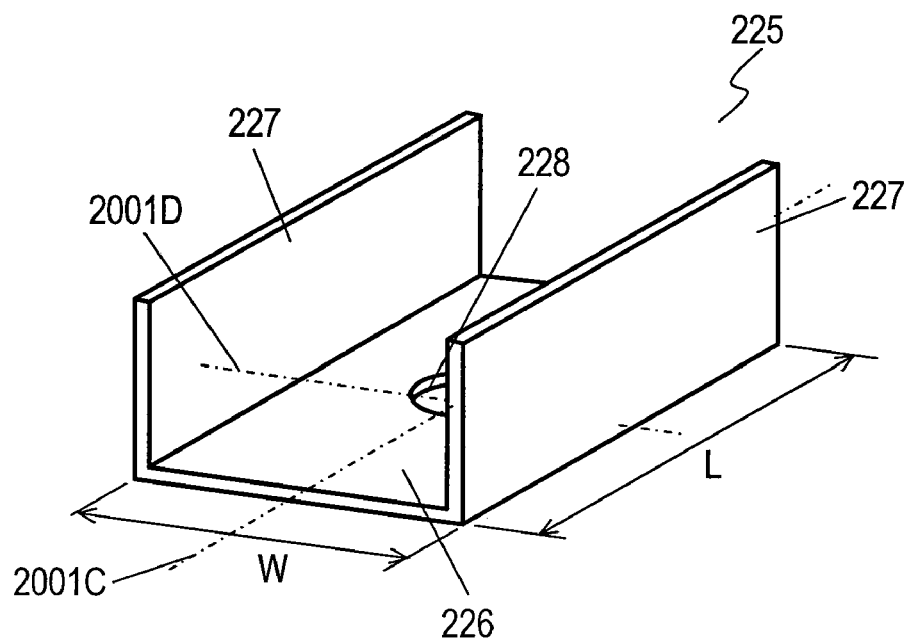
FIG. 8 is a perspective view of a coupler of the solid electrolytic capacitor according to Embodiment 2.

FIG. 8 is a perspective view of coupler 225. Coupler 225 is made of a conductive frame which has a gutter shape having a U-shaped cross section, and has flat bottom portion 226 and side portions 227 extending from both sides of bottom portion 226 substantially perpendicular to bottom portion 226. Coupler 225 is made of a plate made of metal, such as copper, iron, nickel, or alloy, and has a thickness ranging preferably from 0.07 mm to 0.3 mm. In order to reduce its resistance, coupler 225 can have a metallic layer, such as a coating layer, provided on a surface thereof.

As shown in FIGS. 5 and 7, stacked negative electrodes 203 are mounted on bottom portion 226 of coupler 225. Side portions 227 of coupler 225 contact side surfaces of stacked negative electrodes 203 or are close to but away from side surfaces of stacked negative electrodes 203. Coupler 225 is bonded to stacked negative electrodes 203 with conductive adhesive 219. Conductive adhesive 219 can be provided on one of surfaces of bottom portion 226 and side portions 227 of coupler 225. Coupler 225 and negative electrode 203 are bonded preferably after coupler 225 and negative mounting portion 216 are bonded. Coupler 225 may include only bottom portion 226, that is, coupler 225 may not include side portions 227.

Bottom portion 226 of coupler 225 is sandwiched between negative mounting portion 216 and a lower surface of negative electrode 203 of capacitor element 201 closest to coupler 225 out of stacked capacitor elements 201. Bottom portion 226 is bonded to an upper surface of negative mounting portion 216 around aperture 228 by welding, such as resistance welding, ultrasonic welding, or laser welding, and closes opening 1228 of aperture 228.

Package resin 221 has a thin portion located between mounting surface 222 and a lower surface of negative mounting portion 216 facing mounting surface 222. The lower surface of negative mounting portion 216 is opposite to the upper surface of negative mounting portion 216 bonded onto bottom portion 226 of coupler 225.

Resin material of package resin 221 enter into aperture 228 from the lower surface of negative mounting portion 216 to fill aperture 228, and package resin 221 covers negative mounting portion 216 and coupler 225.

Aperture 228 increases bonding strength between negative mounting portion 216 and the thin portion of package resin 221 that covers the lower surface of negative mounting portion 216. This structure prevents a crack in package resin 221, and reduces oxygen entering from outside through the crack to negative electrode 203 of capacitor elements 201.

Aperture 228 is closed by coupler 225, and thereby, prevents oxygen from entering through aperture 228 and the thin portion of package resin 221 at the lower surface of mounting surface 222 to capacitor elements 201.

Package resin 221 filling aperture 228 does not preferably overflow between bottom portion 226 of coupler 225 and negative mounting portion 216. This structure prevents coupler 225 from deforming and prevents capacitor elements 201 from having a mechanical stress thereon, thus preventing characteristics of capacitor elements 201 from deteriorating due to the mechanical stress.

Figure 9:
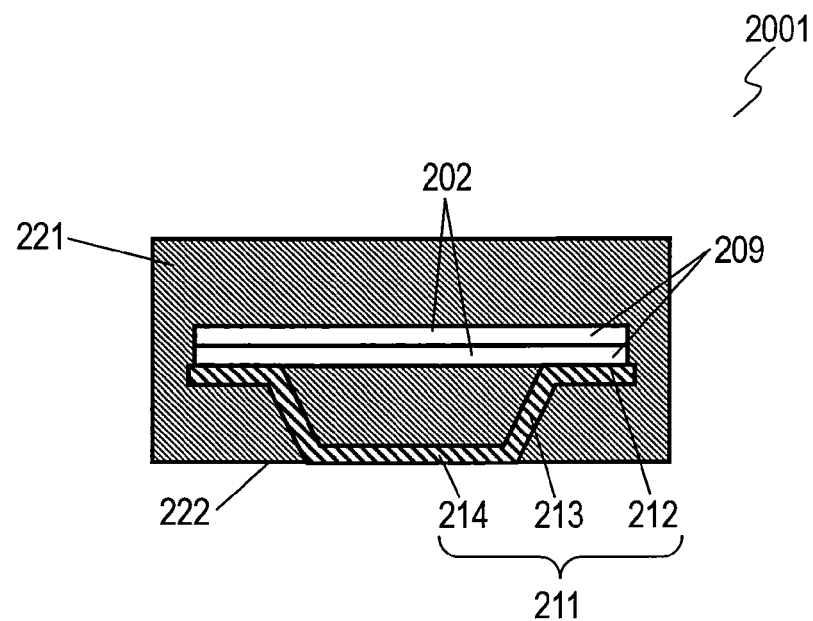
FIG. 9 shows a cross-sectional view of the solid electrolytic capacitor at line 9-9 shown in FIG. 5.

FIG. 9 is a cross-sectional view of solid electrolytic capacitor 2001 at line 9-9 shown in FIG. 5. As shown in FIGS. 5 and 9, each of positive terminals 211 includes positive mounting portion 212, positive extension portion 213, and positive exposed portion 214.

Positive mounting portion 212 has a flat shape, and is directed toward mounting surface 222 of the solid electrolytic capacitor and in parallel with mounting surface 222. Positive mounting portions 212 are, as shown in FIG. 9, provided at respective one ends of positive electrodes 202 located at the side surfaces of capacitor elements 201, and bonded to positive electrode 202 by welding, such as resistance welding, ultrasonic welding, and laser welding, thereby being electrically connected to positive electrode 202. Positive exposed portion 214 is exposed from mounting surface 222 of package resin 221 and provided at a center of mounting surface 222. Positive extension portions 213 are covered with package resin 221, and connected to both ends of positive exposed portion 214 so as to couple positive exposed portion 214 to positive mounting portions 212.

Figure 10:
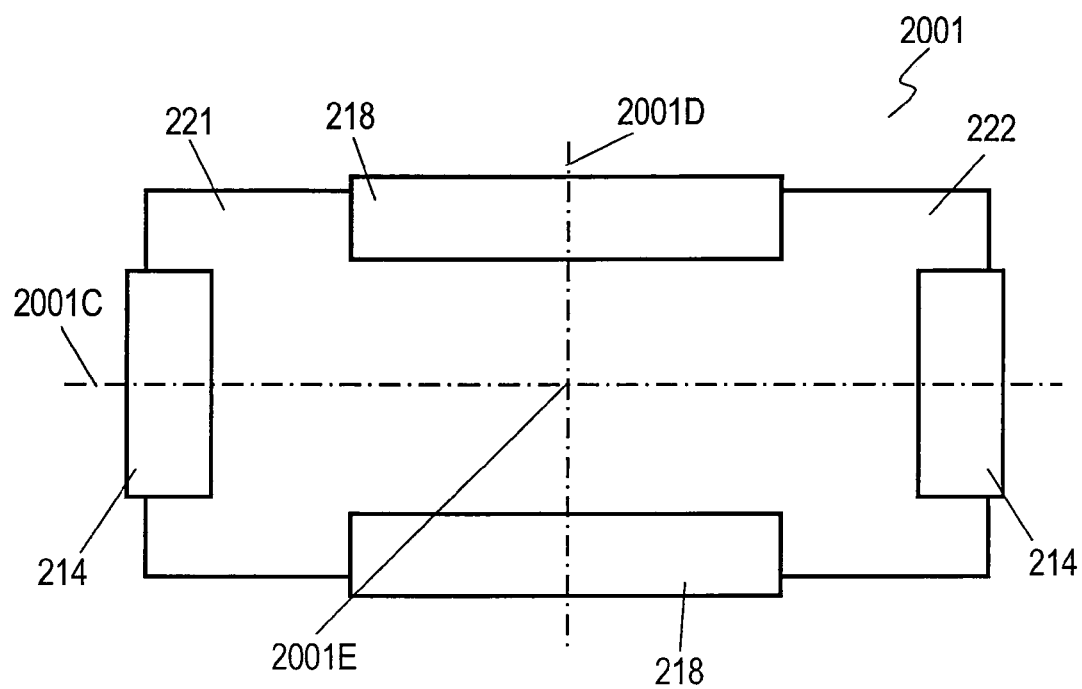
FIG. 10 is a bottom view of the solid electrolytic capacitor according to Embodiment 2.

FIG. 10 is a bottom view of solid electrolytic capacitor 2001. In FIG. 10, axis 2001C extends in directions 2001A and 2001B along which positive electrodes 202 extend, and located at a center between the side surfaces of laminated capacitor elements 201. Axis 2001D is perpendicular to axis 2001C, and disposed at a center between positive electrodes 202 extending in direction 2001A and positive electrode 202 extending in direction 2001B. Crossing point 2001E at which axes 2001C and 2001D cross is positioned at a center of negative electrode 203. Positive exposed portions 214 are provided at positions where end sides of mounting surface 222 crosses axis 2001C. Negative exposed portions 218 are provided at positions where axis 2001D crosses sides of mounting surface 222.

Positive exposed portions 214 and negative exposed portions 218 are flush with mounting surface 222 of package resin 221. Surfaces of positive exposed portions 214 and negative exposed portions 218 are coated with a metallic film, such as an Sn film, in order to be bonded to the circuit board.

Figure 11A:
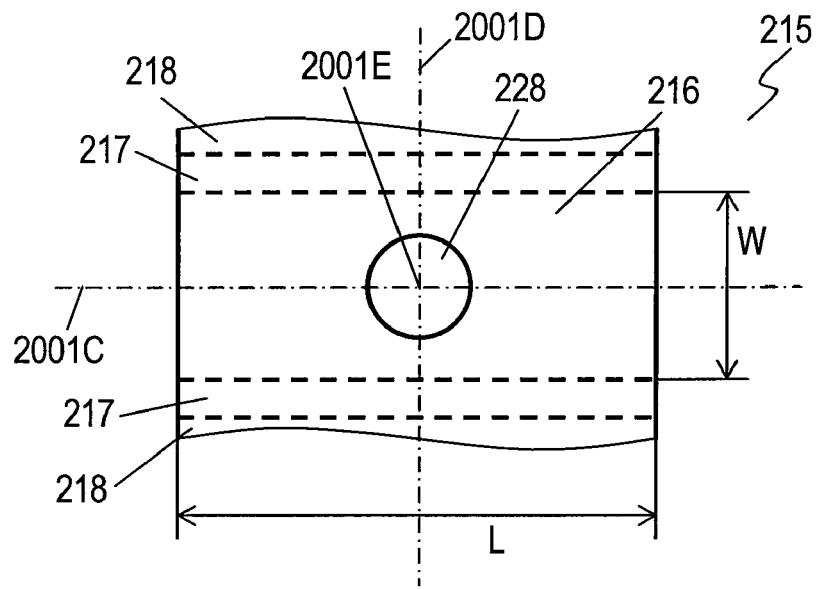
FIG. 11A is a bottom view of an essential portion of a negative terminal of the solid electrolytic capacitor according to Embodiment 2.

FIG. 11A is a bottom view of an essential part of negative terminal 215. Single aperture 228 has a circular shape having its center located at crossing point 2001E, the center of negative mounting portion 216, where axis 2001C crosses axis 2001D. A current flowing through negative mounting portion 216 does not flow in aperture 228. Thus, the current flows easily through a portion adjacent to positive terminal 211. This structure reduces a path of the current flowing sequentially through positive terminal 211, capacitor elements 201, and negative terminal 215, accordingly reducing the ESL, the impedance, of solid electrolytic capacitor 2001.

Figure 11B:
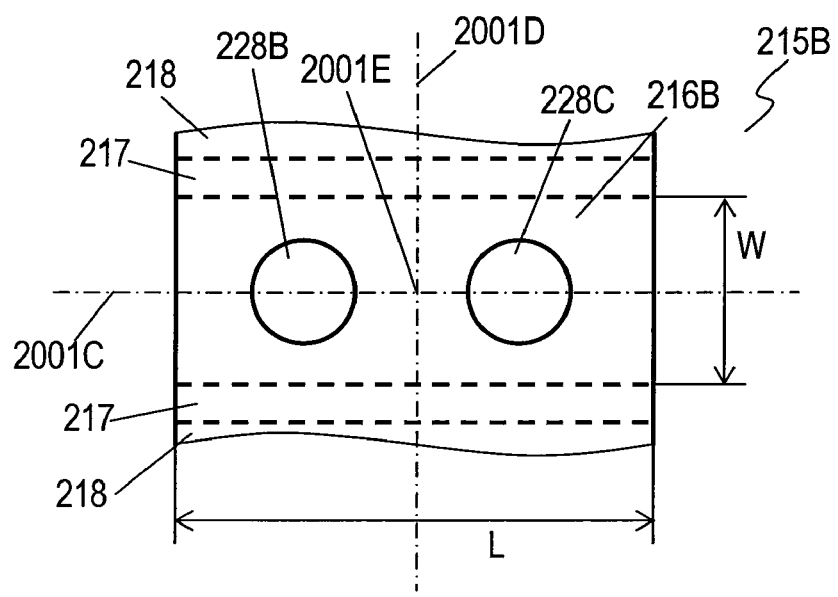
FIG. 11B is a bottom view of an essential portion of another negative terminal of the solid electrolytic capacitor according to Embodiment 2.

FIG. 11B is a bottom view of an essential part of another negative terminal 215B of solid electrolytic capacitor 2001 according to Embodiment 2. In FIG. 11B, components identical to those of negative terminal 215 shown in FIG. 11A are denoted by the same reference numerals, and their description will be omitted. Negative mounting portion 216B of negative terminal 215 has plural apertures 228B and 228C provided therein. Apertures 228B and 228C are located at positions symmetrical to each other with respect to axis 2001D. This arrangement allows a current flowing through capacitor elements 201 having positive electrodes 202 extending in direction 2001A to be identical to a current flowing through capacitor elements 201 having positive electrodes 202 extending in direction 2001B, thereby allowing the amount of heat generated due to an internal resistance of capacitor elements 201 to be identical to each other for the currents in both directions 2001A and 2001B. This prevents various parts of plural capacitor elements 201 from having temperatures rising locally, and prevents characteristics of solid electrolytic capacitor 2001 from deteriorating.

Side portions 227 of coupler 225 entirely the side surfaces of stacked negative electrodes 203 preferably. This arrangement prevents oxygen from entering through the side surfaces of package resin 221.

Side portions 227 of coupler 225 are bonded entirely to the side surfaces of stacked negative electrodes 203 preferably. This structure improves conductivity between negative terminal 215 and stacked capacitor elements 201, thereby reducing an equivalent series resistance (ESR) of the solid electrolytic capacitor.

According to Embodiment 2, negative mounting portion 216 and coupler 225 that are separate components are bonded. However, negative mounting portion 216 and coupler 225 can be unitarily formed. For example, a recess that does not pass through can be provided in one surface of a rectangular metallic block by cutting the metallic block.

Solid electrolytic capacitor 2001 includes plural stacked capacitor elements 201. The solid electrolytic capacitor according to Embodiment 2 can include feed-through capacitor elements instead of capacitor elements 201. Each feed-through capacitor element includes a positive electrode body, positive electrodes provided at both ends of the positive electrode body, and a negative electrode provided between the positive electrodes. The positive electrode body passes through the negative electrode.

Capacitor elements 201 can be stacked such that positive electrodes 202 of all of capacitor elements 201 extend only in direction 2001A from negative electrode 203. In this case, positive terminal 211 is provided at one end of package resin 221, and negative terminal 215 is provided at the other end of package resin 221.

Solid electrolyte layer 206 of capacitor elements 201 can be made of solid electrolyte made of semiconductor, such as manganese dioxide, instead of the solid electrolyte made of conductive polymer. In this case, coupler 225 is bonded to negative mounting portion 216 so as to close aperture 228, and the resin material of package resin 221 fills into aperture 228. This structure increases bonding strength between negative terminal 215 and package resin 221, accordingly preventing the characteristics from deteriorating due to moisture entering from outside.

Example 5

A solid electrolytic capacitor was manufactured as Example 5 according to Embodiment 2. Example 5 of the solid electrolytic capacitor 5 had the same configuration as that of solid electrolytic capacitor 2001 shown in FIG. 5 except for the number of capacitor elements 201.

Positive electrode body 204 of capacitor elements 201 was made of aluminum foil. Solid electrolyte layer 206 was made of solid electrolyte made of conductive polymer, polypyrrole.

Coupler 225 was made of copper and had a thickness of 0.1 mm. Length L of bottom portion 226 of coupler 225 along axis 2001C was 4.0 mm. Width W of bottom portion 226 along axis 2001D was 4.0 mm.

Example 5 of the solid electrolytic capacitor included negative terminal 215 including negative mounting portion 216 shown in FIG. 11A. Negative mounting portion 216 was made of copper, and had a flat plate shape with a thickness of 0.1 mm. Length L of negative mounting portion 216 along axis 2001C was 5.0 mm. Width W of negative mounting portion 216 along axis 2001D was 2.5 mm. A diameter of aperture 228 was 1.0 mm.

Six capacitor elements 201 were stacked such that positive electrodes 202 extended alternately in directions 2001A and 2001B. Positive electrodes 202 of capacitor elements 201 were bonded to positive mounting portions 212 of positive terminals 211, and negative electrodes 203 were bonded to negative mounting portion 216 of negative terminal 215 via coupler 225.

Coupler 225 was bonded to negative mounting portion 216 such that bottom portion 226 of coupler 225 were bonded to a portion of negative mounting portion 216 around aperture 228 by ultrasonic welding to cover aperture 228.

Then, package resin 221 was formed by transfer molding so as to cover capacitor elements 201, coupler 225, positive mounting portions 212, and negative mounting portion 216. Positive exposed portion 214 and negative exposed portions 218 were exposed from mounting surface 222 of package resin 221.

At this moment, the resin material of package resin 221 entered into aperture 228 from the lower surface of negative mounting portion 216, and a thickness of package resin 221 between negative mounting portion 216 and mounting surface 222 was 0.1 mm.

Example 5 of the solid electrolytic capacitor had a rated voltage of 2V, a rated capacity of 220 μF, and its outside dimensions of a length of 8.5 mm by a width of 4.8 mm by a height of 2.0 mm.

Example 6

A solid electrolytic capacitor having the same structure as that of Example 5 of the solid electrolytic capacitor was manufactured as example 6 except for that the capacitor included negative terminal 215 shown in FIG. 11B. Apertures 288B and 288C provided in negative mounting portion 216B were located at positions symmetrically to each other with respect to axis 2001D, and at a center in a direction of width W. A diameter of apertures 288B and 288C was 0.8 mm, and an interval between the centers of apertures 288B and 288C was 1.6 mm.

Comparative Example 2

A solid electrolytic capacitor having the same structure as that of Example 5 of the solid electrolytic capacitor was manufactured as Comparative Example 2 except for that the capacitor included negative mounting portion 216 having no aperture therein.

Three hundred samples were prepared for each of Examples 5 and 6 and Comparative Example 2 of the solid electrolytic capacitors. Initial value R1 of the equivalent series resistance (ESR) after manufacturing of the samples, value R2 of the ESR after a reflow process at a peak temperature of 260° C., and value R3 of the ESR after a high temperature test in which the samples were further left for 1000 hours at a temperature of 105° C. were measured for each sample. The values of the ESR were measured at a frequency of 100 kHz. Table 2 shows averages of the values of the 300 samples for each example.

TABLE 2

| | ESR (mΩ) | | |
| --- | --- | --- | --- |
| | Initial Value R1 | Value R2 After Reflow Process | Value R3 After High Temperature Test |
| Example 5 | 3.1 | 3.1 | 3.3 |
| Example 6 | 3.1 | 3.1 | 3.2 |
| Comparative Example 2 | 3.1 | 3.1 | 6.4 |

As shown in Table 2, initial values R1 and values R2 after the reflow process of all of Examples 5 and 6 and Comparative Example 2 of the solid electrolytic capacitors are the same value, 3.1 mΩ.

Values R3 of Examples 5 and 6 of the solid electrolytic capacitors after the high temperature test are 3.3 mΩ and 3.2 mΩ, respectively, and thus, the ESR does not increase so much. On the other hand, value R3 of Comparative example 2 of the solid electrolytic capacitor after the high temperature test is 6.4 mΩ, and thus, the ESR increases more.

Each of Example 5 and 6 of the solid electrolytic capacitors has a larger bonding strength between the negative terminal and the package resin than Comparative Example 2. Thus, each of Example 5 and 6 prevents cracks from produced in package resin 221 during the reflow process, and hence, is prevented from having the ESR increase due to oxygen entering in the high temperature test, accordingly providing solid electrolytic capacitor 2001 with small impedance.

Capacitor elements 201 can be stacked similarly to capacitor elements 101A and 101B of solid electrolytic capacitor 1001 according to Embodiment shown in FIGS. 2 and 4A to 4D.

According to Embodiment 2, solid electrolytic capacitor 2001 prevents oxygen from entering outside, thereby having small impedance. Therefore, solid electrolytic capacitor 2001 is useful as a capacitor used for, e.g. power supply lines for CPUs.

Exemplary Embodiment 3

Figure 12:
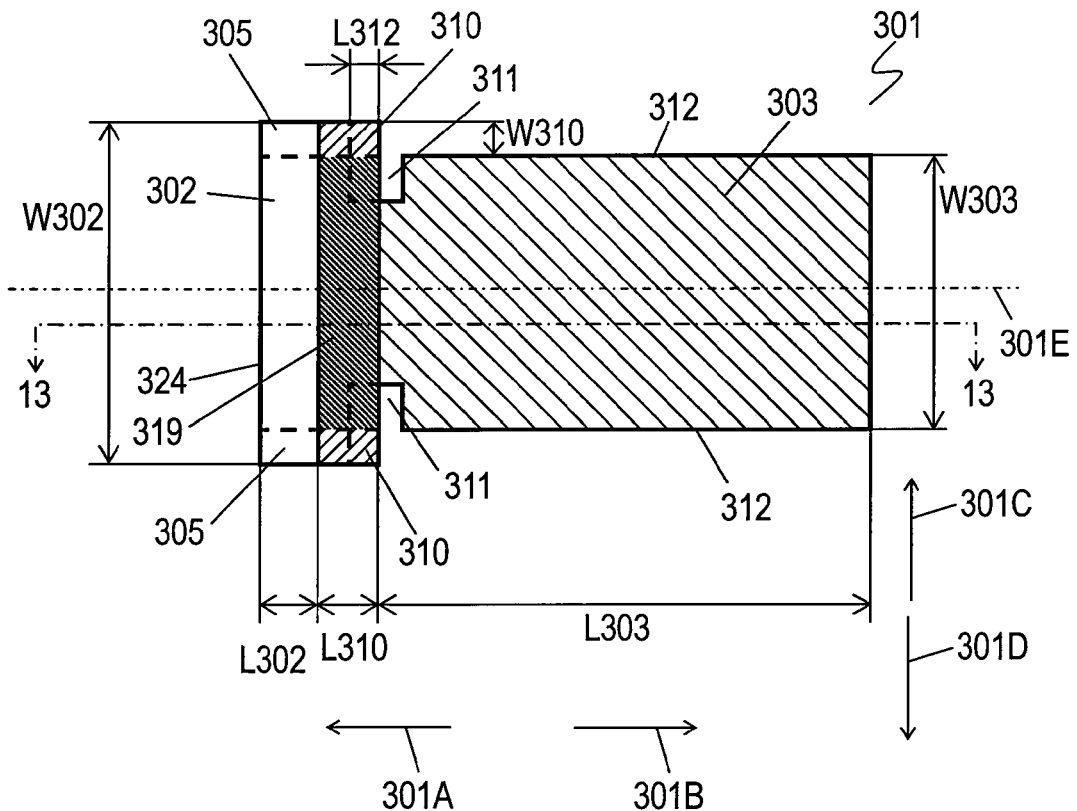
FIG. 12 is a top view of a capacitor element of a solid electrolytic capacitor according to Exemplary Embodiment 3 of the invention.
Figure 13:
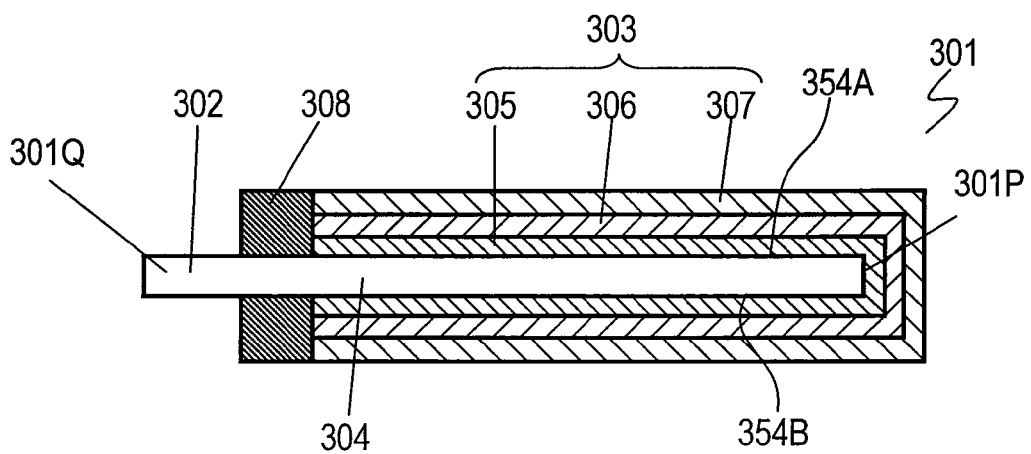
FIG. 13 is a side cross-sectional view of the capacitor element at line 13-13 shown in FIG. 12.

FIG. 12 is a top view of capacitor element 301 according to Exemplary Embodiment 3 of the present invention. FIG. 13 is a side cross-sectional view of capacitor element 301 ay line 13-13 shown in FIG. 12. Capacitor element 301 has a flat plate shape, and includes positive electrode 302 and negative electrode 303. As shown in FIG. 13, capacitor element 301 includes provided with positive electrode body 304. End 301Q of positive electrode body 304 in direction 301A functions as positive electrode 302. Negative electrode 303 is provided on surfaces 354A and 354B of positive electrode body 304 so as to expose positive electrode 302. In other words, negative electrode 303 is provided end 301P of positive electrode body 304 in direction 301B opposite to direction 301A. Positive electrode body 304 is a foil made of valve metal, such as aluminum, tantalum, titanium, or niobium. Surfaces 354A and 354B of positive electrode body 304 are roughened by etching to enlarge their surface areas. Alternatively, positive electrode body 304 can include a porous sintered body provided by sintering powder of valve metal, and a valve metal strip embedded in and bonded to the porous sintered body.

Negative electrode 303 includes dielectric oxide layer 306 formed on surfaces 354A and 354B of positive electrode body 304, solid electrolyte layer 307 formed on dielectric oxide layer 306, and negative electrode layer 308 formed on solid electrolyte layer 307. Dielectric oxide layer 306 is formed by anodizing surfaces 354A and 354B of positive electrode body 304. Solid electrolyte layer 307 is formed on a surface of dielectric oxide layer 306, and made of material selected from the group consisting of conductive polymer, such as polypyrrole, polythiophene, or polyaniline, and inorganic semiconductor, such as manganese oxide. Negative electrode layer 308 includes a carbon layer formed on solid electrolyte layer 307, and a conductive layer formed on the carbon layer. The carbon layer is made of conductive carbon, such as graphite. The conductive layer can be formed by applying conductive paste onto the carbon layer and hardening the paste. The conducting paste contains conductive particles made of conductive material, such as silver, and resin, such as epoxy Positive electrode body 304 has substantively a T-shape. Positive electrode 302 has substantially a rectangular shape.

Width W302 of positive electrode 302 in direction 301C perpendicular to direction 301A is longer than length L302 of positive electrode 302 in direction 301A, that is, positive electrode 302 has a longitudinal direction, direction 301C. Negative electrode 303 has substantially a rectangular shape. Length L303 of negative electrode 303 in direction 301A is longer than width W303 of negative electrode 303 in direction 301C, that is, negative electrode 303 has a longitudinal direction, direction 301A. The shapes of positive electrode 302 and negative electrode 303 are symmetrical with respect to center axis 301E extending in direction 301A.

Positive electrode 302 has positive projecting portions 305 protruding from negative electrode 303 by width W310 in direction 301C and in direction 301D opposite to direction 301C. Specifically, width W302 of direction 301C (301D) of positive electrode 302 is greater than width W303 of direction 301C (301D) of negative electrode 303.

Capacitor element 301 further includes separator 309. Separator 309 separates positive electrode body 304 into positive electrode 302 and negative electrode 303 so as to prevent solid electrolyte layer 307 and negative electrode layer 308 from being formed on positive electrode 302.

A portion of dielectric oxide layer 306 at a boundary where separator 309 contacts solid electrolyte layer 307 is often thinner than other portions of dielectric oxide layer 306. Negative electrode layer 308 is preferably apart from the boundary between separator 309 and solid electrolyte layer 307 so that the carbon layer and the silver paste layer of negative electrode layer 308 may not contact dielectric oxide layer 306.

Separator 309 is a thin resin film made of insulating resin, such as a polyimide resin or silicone resin, and formed on upper surface 354A and lower surface 354B of positive electrode body 304. Separator 309 has a strip shape extending in direction 301C (301D) on positive electrode body 304 at a boundary between positive electrode 302 and negative electrode 303.

Separator 309 includes insulators 310. Portions of insulators 310 facing negative electrode 303 contact positive projecting portion 305. Positive projecting portion 305 is a portion of positive electrode body 304 which is not covered with separator 309.

Insulators 310 are films provided on upper surface 354A and lower surface 354B of positive electrode body 304. Each of portions of insulators 310 has length L310 in direction 301A, and covers an end and an edge surface of a protrusion of positive electrode body 304 facing negative electrode 303.

The portions of insulators 310 protrude from the end of positive electrode body 304 facing negative electrode 303 by length L312 in direction 301B, sandwich the end, and are bonded to each other with insulating adhesive. Thus, insulators 310 are unitarily formed with separator 309. Insulators 310 can be formed of members separate from separator 309.

As shown in FIG. 12, cutouts 311 are preferably provided in side surfaces 312 of negative electrode 303 facing positive electrode 302 of capacitor element 301. Cutouts 311 are provided in positive electrode body 304 near the boundary between positive electrode 302 and negative electrode 303. An edge of cutout 311 directed in direction 301B faces positive electrode 302 of negative electrode 303. An edge of cutout 311 directed in direction 301A is covered with separator 309 and insulator 310.

Figure 14:
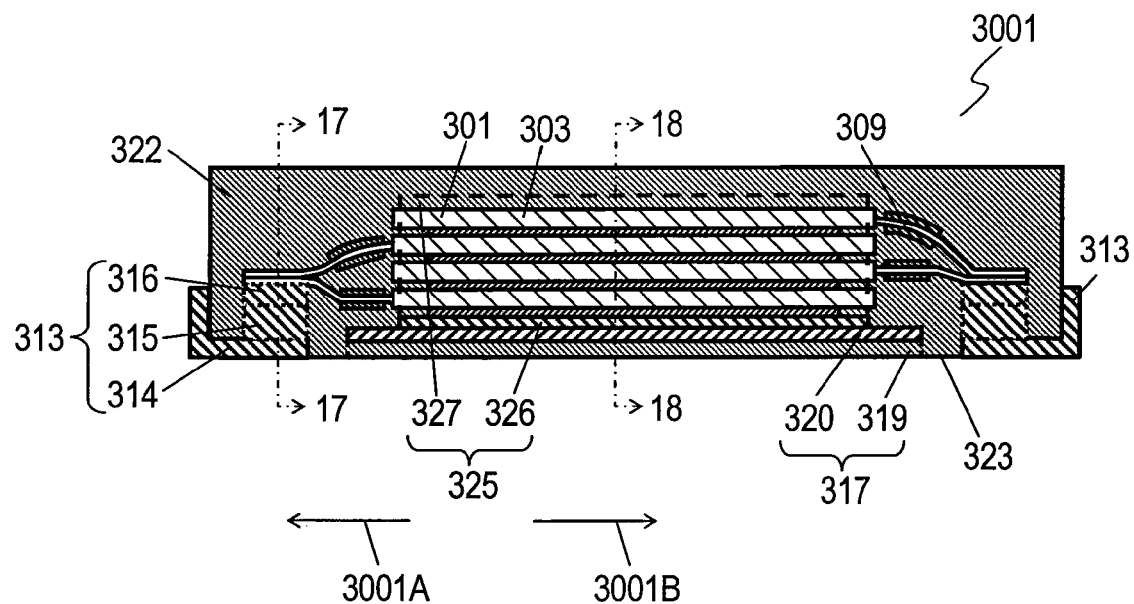
FIG. 14 is a side cross-sectional view of the solid electrolytic capacitor according to Embodiment 3.
Figure 15:
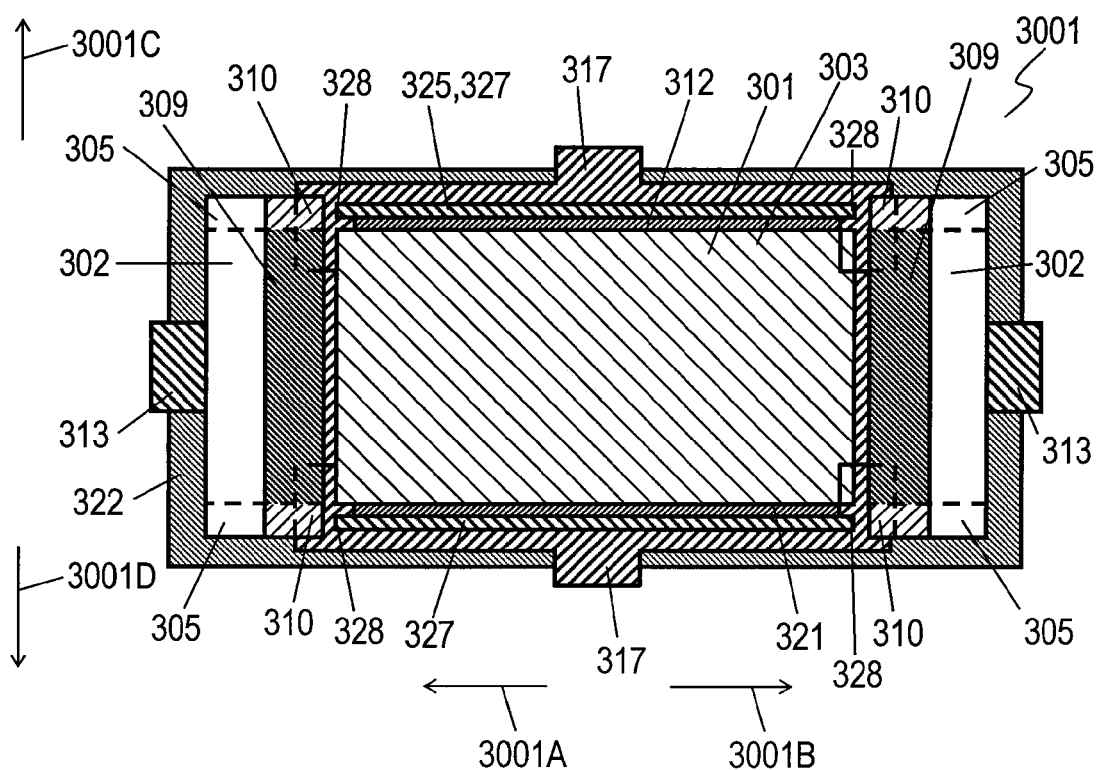
FIG. 15 is a top view of the solid electrolytic capacitor according to Embodiment 3.
Figure 16:
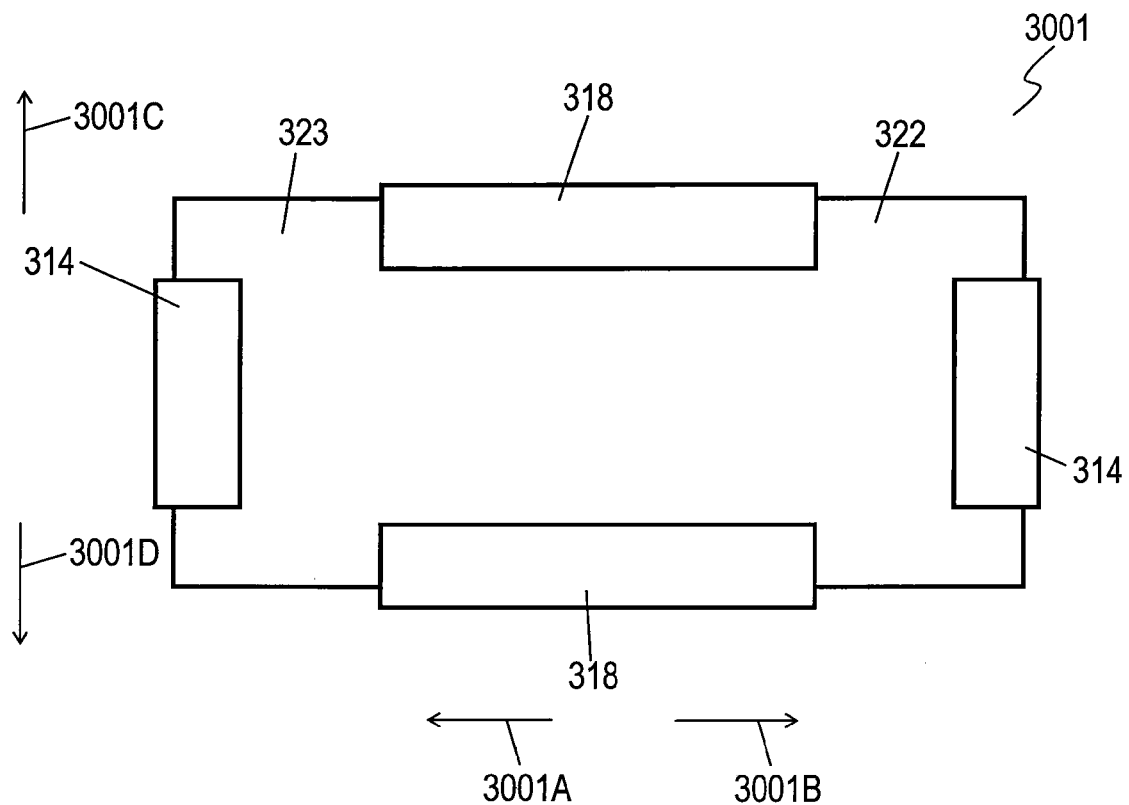
FIG. 16 is a bottom view of the solid electrolytic capacitor according to Embodiment 3.

FIG. 14 is a side cross-sectional view of solid electrolytic capacitor 3001 according to Embodiment 3. FIGS. 15 and 16 are a top view and a bottom view of solid electrolytic capacitor 3001, respectively. Solid electrolytic capacitor 3001 includes plural stacked capacitor elements 301, positive terminals 313, negative terminal 317, and package resin 322 that covers the capacitor elements 301.

Negative electrodes 303 of plural capacitor elements 301 are stacked. Positive electrodes 302 of capacitor elements 301 extend from negative electrodes 303 alternately in directions 3001A and 3001B opposite to each other. Specifically, stacked negative electrodes 303 are positioned between positive electrodes 302 that extend in direction 3001A from negative electrodes 303 and positive electrodes 302 that extend in direction 3001B from negative electrodes 303.

Positive electrodes 302 of capacitor elements 301 are stacked, and are mounted on and electrically connected to the upper surfaces of positive terminals 313. Negative electrodes 303 of capacitor elements 301 are stacked, and are mounted on and electrically connected to the upper surface of negative terminal 317.

Negative electrode coupler 325 is fixed to negative terminal 317 and electrically connected to negative terminal 317. As shown in FIG. 15, negative electrode coupler 325 extends along side surface 312 of stacked negative electrodes 303. Insulators 310 of capacitor element 301 face edges 328 of negative electrode coupler 325 in directions 301A and 301B Positive terminals 313 and negative terminal 317 are frames made of metal, such as copper, iron, or nickel, or alloy, such as Fe—Ni alloy. Positive terminals 313 face stacked positive electrodes 302. Negative terminal 317 face stacked negative electrodes 303. Negative terminal 317 is located between positive terminals 313 provided at both ends.

Figure 17:
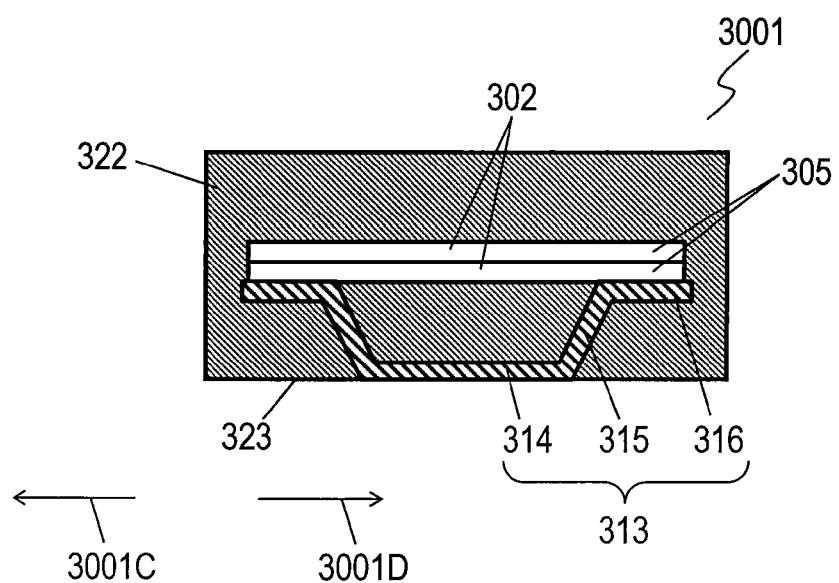
FIG. 17 is a cross-sectional view of the solid electrolytic capacitor at line 17-17 shown in FIG. 14.

FIG. 17 is a cross-sectional view of solid electrolytic capacitor 3001 at line 17-17 shown in FIG. 14. Each positive terminal 313 includes positive exposed portion 314, positive extension portions 315, and positive flat portion 316. Positive extension portions 315 and positive flat portion 316 are embedded in package resin 322.

Positive exposed portions 314, as shown in FIG. 16, are exposed at end portions of lower surface 323 of package resin 322 that constitutes a mounting surface, and extend in directions 3001A and 3001B from end surfaces of package resin 322 toward a center of lower surface 323 of package resin 322. Surfaces of positive exposed portions 314 can be coated with a metallic film, such as an Sn coating, in order to be mounted onto a circuit board. As shown in FIG. 17, positive exposed portions 314 are provided at end portions of lower surface 323 of package resin 322 at a center in directions 3001C and 3001D perpendicular to directions 3001A and 3001B.

Each positive extension portion 315, as shown in FIG. 17, is coupled to one end of positive exposed portion 314 at the center of lower surface 323 of package resin 322 in directions 3001C and 3001D, and extends slantingly upward and outward in directions 3001C and 3001D.

Each positive flat portion 316 is coupled to an upper end of positive extension portion 315, and is parallel to positive electrode body 304 of capacitor element 301. Upper surfaces of positive flat portions 316 are bonded to stacked positive electrodes 302 by welding.

Figure 18:
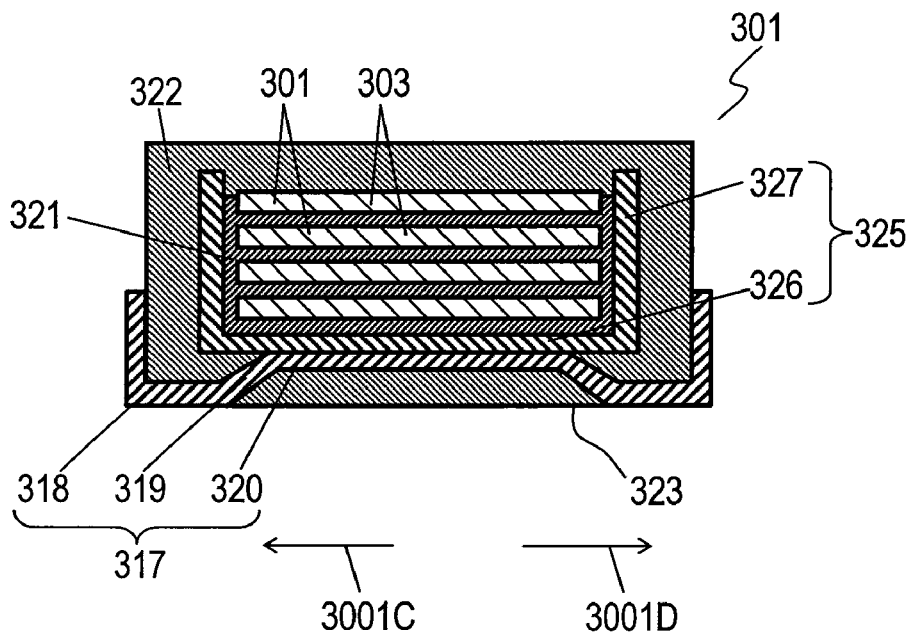
FIG. 18 is a cross-sectional view of the solid electrolytic capacitor at line 18-18 shown in FIG. 14.
Figure 19:
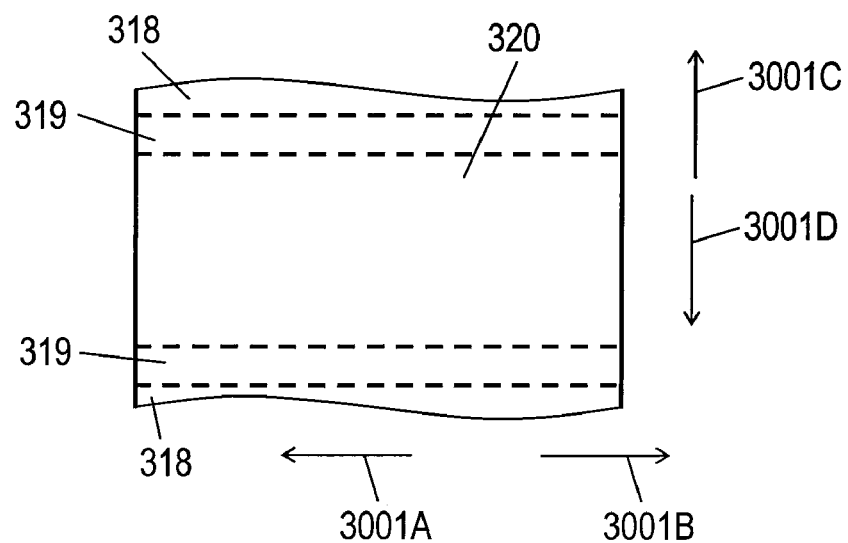
FIG. 19 is a top view of an essential portion of a negative terminal of the solid electrolytic capacitor according to Embodiment 3.

FIG. 18 is a cross-sectional view of solid electrolytic capacitor 3001 ay lines 18-18 shown in FIG. 14. FIG. 19 is a top view of an essential part of negative terminal 317. Negative terminal 317 is, as shown in FIG. 18, includes negative exposed portion 318, negative extension portions 319, and negative flat portion 320. Negative extension portions 319 and negative flat portion 320 are embedded in package resin 322.

Negative exposed portions 318, as shown in FIG. 16, are exposed at lower surface 323 of package resin 322, and located at a center between positive exposed portions 314 provided at the end portions of lower surface 323. Further, negative exposed portions 318 are located apart from each other on both side surfaces of lower surface 323 of package resin 322 in directions 3001C and 3001D perpendicular to directions 3001A and 3001B. Negative exposed portions 318 extend from the side surfaces of package resin 322 toward lower surface 323 of package resin 322 in directions 3001C and 3001D, respectively.

Surfaces of negative exposed portions 318 are coated with a metallic film, such as an Sn coating, in order to be mounted onto a circuit board.

Negative extension portions 319 are, as shown in FIG. 18, coupled to an end portion of negative exposed portion 318 in directions 3001C and 3001D, and extend slantingly upward toward the center from an entire end side of negative exposed portions 318, as shown in FIGS. 18 and 19.

Negative flat portion 320 has a flat shape, and coupled to an upper end of negative extension portions 319. Negative flat portion 320 is located at a center between negative extension portions 319. An upper surface of negative flat portion 320 is bonded to negative electrode coupler 325 by welding.

A length of negative flat portion 320 in direction 3001A is preferably longer than a length of negative electrode 303 in direction 3001A. This structure reduces the ESR and ESL of solid electrolytic capacitor 3001.

Figure 20A:
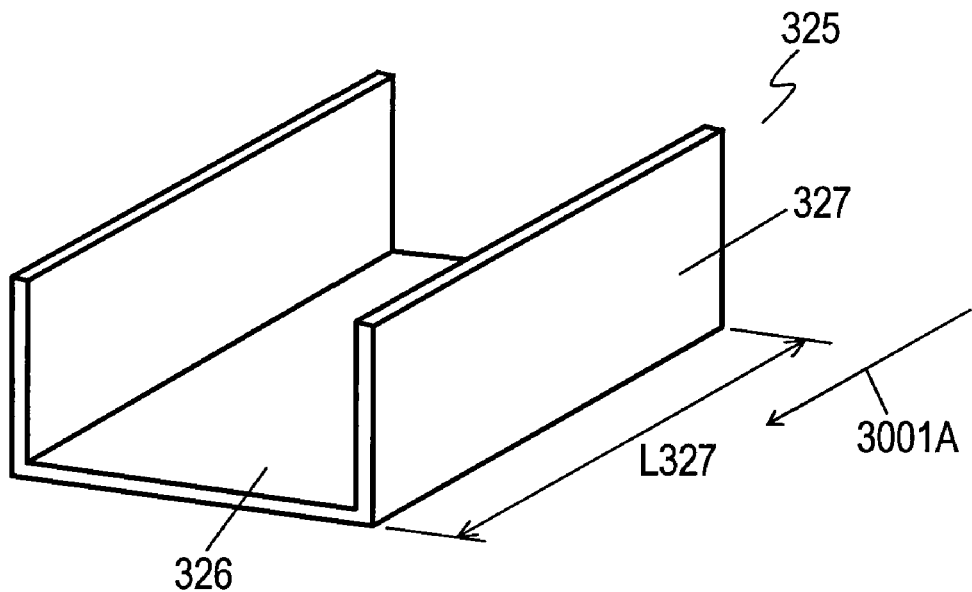
FIG. 20A is a perspective view of a negative electrode coupler of the solid electrolytic capacitor according to Embodiment 3.

FIG. 20A is a perspective view of negative electrode coupler 325 according to Embodiment 3. Negative electrode coupler 325 is a conductive frame having a gutter shape having a U-shaped cross section, and includes flat bottom portion 326 and side portions 327 extending from bottom portion 326 substantially perpendicular to bottom portion 326. Negative electrode coupler 325 is made of a metal plate made of metal, such as copper, iron, nickel, or alloy. Negative electrode coupler 325 may have a coating layer on a surface thereof in order to reduce a connecting resistance.

In negative electrode coupler 325, as shown in FIG. 18, bottom portion 326 is sandwiched between a lowermost layer of stacked negative electrodes 303 and negative flat portion 320. A lower surface of bottom portion 326 and an upper surface of negative flat portion 320 of negative terminal 317 are bonded by welding. Stacked negative electrodes 303 and negative terminal 317 are electrically connected via negative electrode coupler 325.

In negative electrode coupler 325, stacked negative electrodes 303 are accommodated in a gutter and sandwiched between side portions 327 on both sides.

In negative electrode coupler 325, as shown in FIG. 15, edges 328 of side portions 327 and insulators 310 that contact positive projecting portions 305 extend in direction 3001A. Edges 328 of side portions 327 contact insulator 310, or are close to but apart from insulator 310. Side portions 327 are provided substantially entirely along side surfaces 312 of stacked negative electrodes 303.

Negative electrode coupler 325 is bonded to stacked negative electrodes 303 with conductive adhesive 321.

Conductive adhesive 321 is, as shown in FIG. 18, provided between side portions 327 and side surfaces 312 of stacked negative electrodes 303, or between bottom surface 326 and a lower surface of stacked negative electrodes 303.

Capacitor element 301 may be displaced in direction 3001C or 3001D with respect to negative terminal 317. Even in this case, cutouts 311 prevents negative electrode coupler 325 from contacting solid electrolyte layer 307 near separator 309 and damaging solid electrolyte layer 307 or dielectric oxide layer 306, thereby reducing a leakage current.

Negative electrode coupler 325 can be formed by coupling two separate frames having L-shapes to negative flat portion 320 of negative terminal 317, instead of a single frame having the U-shape.

Figure 20B:
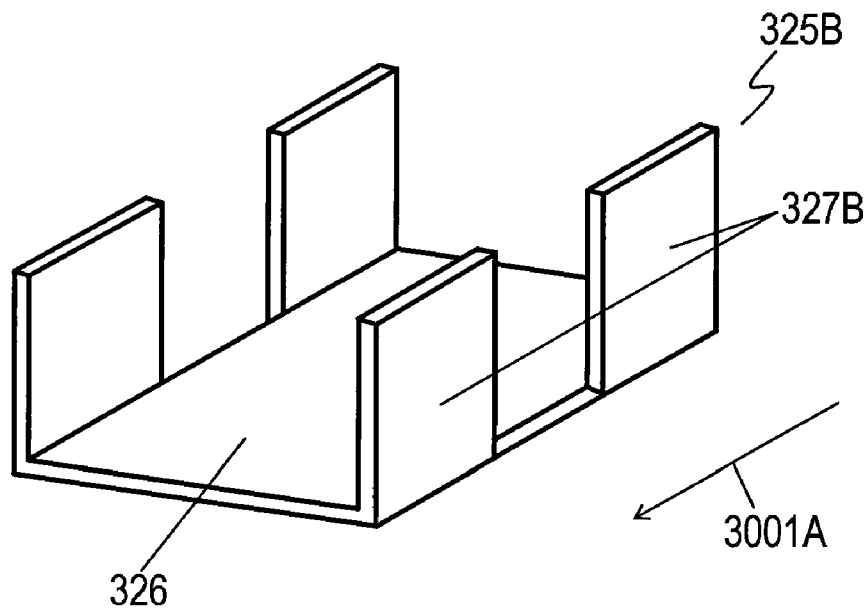
FIG. 20B is a perspective view of another negative electrode coupler of the solid electrolytic capacitor according to Embodiment 3.

FIG. 20B is a perspective view of another negative electrode coupler 325B according to Embodiment 3. Negative electrode coupler 325B includes side portions 327B separately arranged in direction 3001A.

As described above, insulators 310 contacting the portion of positive projecting portion 305 facing negative electrode 303 prevent side portions 327 of negative electrode coupler 325 from being connected electrically with positive projecting portion 305, thus reducing a leakage current of solid electrolytic capacitor 3001.

This structure allows edges 328 of negative electrode coupler 325 to be located close to positive electrodes 302 so as to reduce the length of a path of a current flowing sequentially through a land of a circuit board, positive terminals 313, capacitor element 301, negative electrode coupler 325, and negative terminal 317, accordingly reducing the ESR and ESL of solid electrolytic capacitor 3001.

Side portions 327 of negative electrode coupler 325 are preferably provided entirely along side surfaces 312 of stacked negative electrodes 303, and bonded to side surfaces 312 of stacked negative electrodes 303 with conductive adhesive 321. This structure reduces a resistance between negative terminal 317 and negative electrode 303 of each capacitor element 301, thus reducing the ESR of solid electrolytic capacitor 3001.

Negative electrode coupler 325 preferably has a U-shaped cross section, as shown in FIG. 20A, and bottom portion 326 and side portions 327 cover entirely the lower surface and side surface 312 of stacked negative electrodes 303. This structure increase a length of a path of moisture and oxygen entering through package resin 322 into negative electrodes 303 of capacitor element 301, accordingly improving a sealing property to prevent characteristics of capacitor element 301 from deteriorating.

Next, a method of manufacturing solid electrolytic capacitor 3001 will be described below.

First, capacitor elements 301, positive terminals 313, negative terminal 317, negative electrode coupler 325 are formed.

Positive electrode body 304 is formed by cutting a valve metal foil into a T-shape. Surfaces of positive electrode body 304 to have negative electrodes 303 provided thereon are roughened by etching to increase their surface areas, and then dielectric oxide layer 306 is formed on positive electrode body 304 by anodizing.

Then, an insulating tape is attached onto positive electrode body 304 at a boundary between positive electrode 302 and negative electrode 303 to form separator 309. Insulator 310 of separator 309 contacts positive projecting portion 305. Separator 309 can be formed by applying insulating resin paste onto positive electrode body 304 and hardened, instead of the insulating tape.

Than, solid electrolyte layer 307 made of conductive polymer is formed by electrolytic polymerization or chemical polymerization. Solid electrolyte layer 307 made of conductive polymer can be formed by attaching conductive polymer.

Then, negative electrode layer 308 is provided on solid electrolyte layer 307, thus providing capacitor element 301.

Each of positive terminal 313 and negative terminal 317 is formed by punching and bending a metal plate having a strip shape.

Positive extension portions 315 and positive flat portion 316 are unitarily formed of a metal plate via positive exposed portion 314. Negative extension portions 319 and negative flat portion 320 are unitarily formed of a metal plate via negative exposed portions 318.

Negative electrode coupler 325 is shaped as shown in FIG. 19 by punching and bending a metal plate.

Next, negative electrode coupler 325 is bonded to negative terminal 317.

Bottom portion 326 of negative electrode coupler 325 is placed on the upper surface of negative flat portion 320, and then, bottom portion 326 is bonded to negative flat portion 320 by resistance welding, ultrasonic welding, or laser welding.

Negative electrode coupler 325 can be formed unitarily with negative terminal 317, instead of being prepared separately from negative terminal 317 and being bonded to negative terminal 317. Alternatively, negative electrode coupler 325 can be formed by punching a portion of negative extension portions 319 when negative terminal 317 is formed, and by bending the punched portion of the metal plate upward perpendicular to the bottom portion.

The metal plates used for positive terminals 313, negative terminal 317, and negative electrode coupler 325 is made of metal, such as copper, iron, or nickel, or alloy, and have a thickness ranging from 0.07 mm to 0.3 mm.

Then, plural capacitor elements 301 are mounted to negative electrode coupler 325 and positive terminals 313.

First, conductive adhesive is applied onto bottom portion 326 and side portions 327 of negative electrode coupler 325, and negative electrode 303 of one of capacitor elements 301 is mounted onto negative electrode coupler 325 while being accommodated between side portions 327 at the both sides of negative electrode coupler 325. Positive electrode 302 is mounted onto positive flat portion 316.

When negative electrode 303 is mounted onto negative electrode coupler 325, insulators 310 contact or is located close to edges 328 of side portions 327 while moving insulators 310 of capacitor element 301 either downward along edges 328 of side portions 327 of negative electrode coupler 325, or slantingly downward toward edges 328 of side portions 327.

Next, conductive adhesive is applied onto negative electrode 303 and negative electrode coupler 325 of capacitor element 301 located above the previously applied conductive adhesive, and then, another capacitor elements 301 is stacked on capacitor element 301 under the adhesive.

The above process is repeated so as to stack and mount plural capacitor elements 301 so that negative electrodes 303 are located directly above or directly under each other.

The conductive adhesive is applied at a center of stacked negative electrodes 303 in order to prevent the conductive adhesive from coming out over separator 309 and contacting positive electrodes 302 of capacitor elements 301 due to a pressure applied to stack capacitor elements 301.

Next, stacked capacitor elements 301 are bonded to negative electrode coupler 325 and positive terminals 313.

When negative electrode coupler 325 is bonded to stacked negative electrodes 303, conductive adhesive 321 is formed by hardening conductive adhesive agent at a high temperature while applying a pressure to stacked negative electrodes 303. Then, the laminated surfaces of negative electrodes 303 are bonded simultaneously when side portions 327 of negative electrode coupler 325 are bonded to side surfaces 312 of stacked negative electrodes 303 with conductive adhesive 321.

A pressure is applied to stacked positive electrodes 302 simultaneously when a pressure is applied to stacked negative electrodes 303.

Positive terminals 313 are bonded to stacked positive electrodes 302 so that the upper surface of positive flat portions 316 are bonded to stacked positive electrodes 302 by resistance welding, ultrasonic welding, or laser welding while applying a pressure to staked positive electrodes 302.

When capacitor elements 301 are mounted onto negative electrode coupler 325, or when a pressure is applied to stacked capacitor elements 301, capacitor elements 301 may be displaced in direction 3001A or 3001B toward negative electrode 303 of capacitor element 301. Even in this case, positive projecting portions 305 stop at edges 328 of side portion 327 of negative electrode coupler 325 via insulators 310, thereby preventing capacitor elements 301 from being displaced.

Since capacitor elements 301 are prevented from being displaced, negative electrodes 303 of capacitor elements 301 can be accurately stacked and do not reduce effects of canceling the magnetic field, thus reducing the ESL.

Then, package resin 322 is formed by molding using insulating resin, such as epoxy resin.

Package resin 322 covers capacitor elements 301, negative electrode coupler 325, positive extension portions 315, and positive flat portions 316 of positive terminals 313, and negative extension portions 319 and negative flat portion 320 of negative terminal 317. Further, package resin 322 exposes positive exposed portion 314 and negative exposed portions 318 from lower surface 323.

Package resin 322 is formed, such that metal plates connected to positive exposed portion 314 and negative exposed portions 318 protrude from package resin 322 on the same plane as lower surface 323. Then, the protruding metal plates are bent upward along side surfaces of package resin 322, thus providing solid electrolytic capacitor 3001.

Exemplary Embodiment 4

Figure 21:
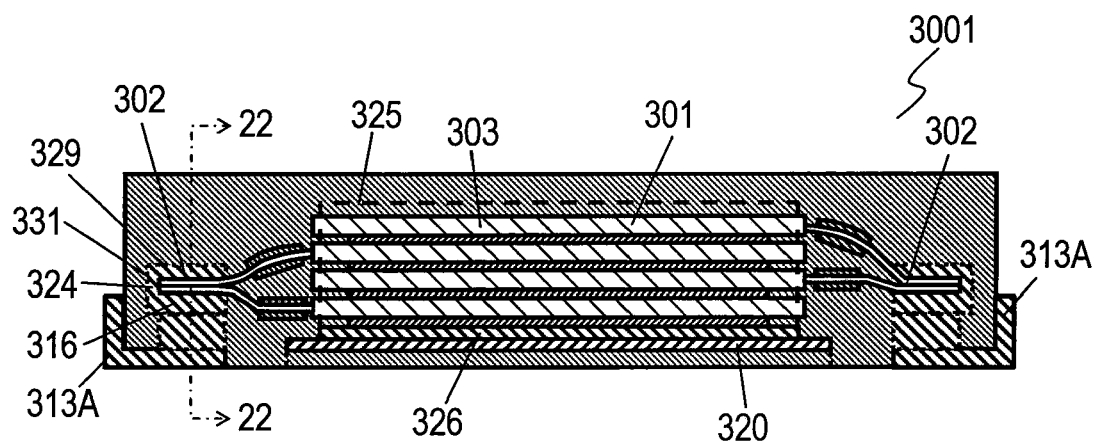
FIG. 21 is a side cross-sectional view of a solid electrolytic capacitor according to Exemplary Embodiment 4 of the invention.
Figure 22:
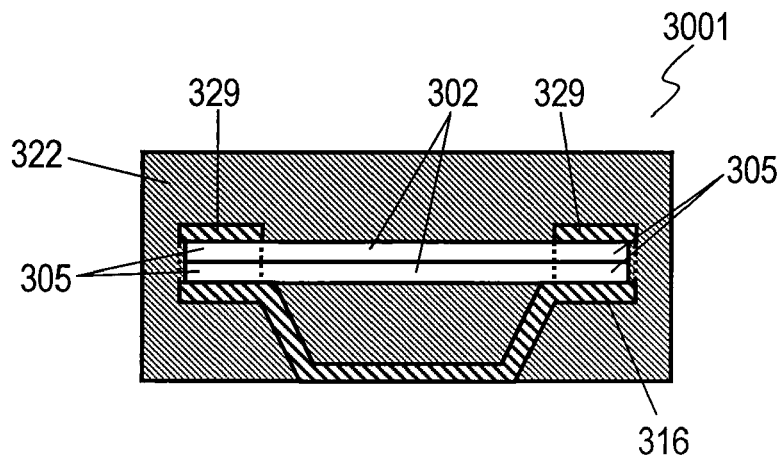
FIG. 22 is a cross-sectional view of the solid electrolytic capacitor at line 22-22 shown in FIG. 21.

FIG. 21 is a side cross-sectional view of solid electrolytic capacitor 3002 according to Exemplary Embodiment 4 of the present invention. FIG. 22 is a cross-sectional view of solid electrolytic capacitor 3002 ay line 22-22 shown in FIG. 21. In FIGS. 21 and 22, components identical to those of solid electrolytic capacitor 3001 according to Embodiment 3 shown in FIGS. 13 to 18 are denoted by same reference numerals, and their detail description will be omitted. Solid electrolytic capacitor 3002 according to Embodiment 4 further includes positive electrode couplers 331 provided at positive terminals 313 of solid electrolytic capacitor 3001 according to Embodiment 3.

As shown in FIGS. 21 and 22, positive electrode couplers 331 are fixed to positive terminals 313A and provided at four positive flat portions 316 of positive terminals 313A, respectively, and coupled to end portions of positive flat portions 316 opposite to negative flat portion 320.

Positive electrode couplers 331 are provided along side surfaces 324 of positive electrodes 302 opposite to insulators 310 of capacitor elements 301. Positive electrode couplers 331 extend perpendicularly from the end portion coupled to positive flat portions 316 and along side surfaces 324 of positive projecting portions 305. Positive electrode couplers 331 is bent at upper end portions 329 and contact the upper surface of stacked positive electrodes 302.

Upper end portions 329 of positive electrode couplers 331 are bonded to stacked positive electrodes 302 by welding.

Positive electrode coupler 331 is formed unitarily with positive flat portion 316 of positive terminal 313A by punching a metal plate. Positive electrode couplers 331 can be metal plates provided separately from positive terminals 313A and bonded to positive flat portions 316.

A method of bonding capacitor elements 301 to positive terminals 313A and negative terminal 317 will be described below.

First, plural capacitor elements 301 are mounted on negative electrode coupler 325 and positive terminals 313A, such that positive electrode couplers 331 are upward from the end portions of positive flat portions 316 and perpendicularly to positive flat portions.

Capacitor elements 301 are accommodated in the gutter having the U-shape of negative electrode coupler 325 while positive projecting portions 305 of capacitor elements 301 are inserted between the upright positive electrode couplers 331 and edges 328 of negative electrode coupler 325. Then, plural capacitor elements 301 are stacked.

Next, stacked capacitor elements 301 are bonded to negative electrode coupler 325 and positive terminals 313A.

First, negative electrode coupler 325 is bonded to stacked negative electrodes 303. Similarly to Embodiment 3, conductive adhesive agent is hardened at a high temperature while a pressure is applied to stacked negative electrodes 303 so as to bond negative electrode coupler 325 to stacked negative electrodes 303 with conductive adhesive 321. Simultaneously, conductive adhesive 321 bonds between stacked negative electrodes 303.

Next, positive electrode couplers 331 are bonded to stacked positive electrodes 302. Upper end portions 329 of positive electrode couplers 331 extending upward are bent to form a U-shape to enclose stacked positive electrodes 302, and contact an upper surface of positive electrode 302 of uppermost capacitor element 301. Then, while a pressure is applied onto stacked positive electrodes 302 in a stacking direction, upper end portions 329 of positive electrode couplers 331 are bonded to stacked positive electrodes 302 by welding.

According to Embodiment 4, when capacitor elements 301 are mounted to negative electrode coupler 325, or when the pressure is applied to stacked capacitor elements 301, capacitor elements 301 may be displaced in direction 3001A or 3001B. Even in this case, positive projecting portions 305 stop at either positive electrode couplers 331 or negative electrode coupler 325, thereby preventing capacitor elements 301 from being displaced in directions 3001A and 3001B.

Negative electrodes 303 of capacitor elements 301 directed opposite directions according to embodiment 4 can be stacked more accurately than those of Embodiment 3, and do not spoil effect of canceling magnetic fields, thus reducing the ESL.

According to Embodiments 3 and 4, plural capacitor elements 301 are stacked so that positive electrodes 302 extend alternately in the opposite directions. Positive electrodes 302 of plural capacitor elements 301 can extend only in only one of the directions. In this case, a single positive terminal is provided on one end of the package resin and the negative terminal is provided on the other end, while the positive terminals are provided on the both ends of the package resin according to Embodiment 3. Alternatively, capacitor elements 301 can be stacked in the same manner as capacitor elements 101A and 101B of solid electrolytic capacitor 1001 according to Embodiment 1 as shown in FIGS. 2 and 4A to 4D.

Solid electrolytic capacitor 3001 with a rated voltage of 2V and a capacitance of 220 μF was manufactured as example 7, as shown in FIG. 14, by bonding the negative electrode coupler to a center of the negative flat portion of the negative terminal to stack five capacitor elements 301 so that positive electrodes 302 extend alternately in the opposite directions, and capacitor elements 301 are accommodated in negative electrode coupler 325.

Each of the capacitor elements of example 7 has the T-shape shown in FIG. 12, and is different from capacitor element 301 shown in FIG. 12 in that cutout 311 is not provided in the side surface of the negative electrode on the side of the positive electrode. Positive projecting portion 305 had width W305 of 0.3 mm and length L302 of 1.0 mm. Negative electrode 303 had width W303 of 3.4 mm and length L303 of 4.0 mm. Insulator 310 had width W310 of 0.3 mm and length L310 of 0.8 mm. Length L312 of a portion of insulator 310 coming out of positive electrode body 304 toward negative electrode 303 was 0.4 mm.

A frame having a thickness of 0.1 mm made of copper was used for negative electrode coupler 325 shown in FIG. 20A, and length L327 of the side portion of negative electrode coupler 325 was 3.8 mm.

A solid electrolytic capacitor was manufactured as Comparative Example 3 that has the same configuration as that of Example 7 except for configurations of the capacitor element and the negative electrode coupler. Comparative Example 3 of the solid electrolytic capacitor had a rated voltage of 2V and a capacitance of 220 μF.

The capacitor element of Comparative Example 3 of the solid electrolytic capacitor had the rectangular shape shown in FIG. 26, and the negative electrode of the capacitor element had the same width of 3.4 mm and length of 4.0 mm as the negative electrode of Example 7. The length of the separator was 1.0 mm. The negative electrode coupler was the same as that of Example 7 other than that dimension is different, that is, length L327 of the side portion of the negative electrode coupler was 2.0 mm.

One hundred samples are prepared for each of Example 7 and Comparative Example 3 of the solid electrolytic capacitors. Averages of values of the ESR at a frequency of 100 MHz and the ESL at frequency of 500 MHz were calculated. The results of the calculation are shown in Table 3.

TABLE 3

|  | ESR (mΩ) | ESL (pH) |
| --- | --- | --- |
| Example 7 | 2.5 | 71 |
| Comparative Example 3 | 3.4 | 84 |

As shown in Table 3, the ESR of Example 7 at the frequency of 100 MHz was 2.5 mΩ, while the ESR of Comparative example 7 was 3.4 mΩ. The ESL of Example 7 at frequency of 500 MHz was 71 pH, while the ESL of Comparative Example 3 was 84 pH.

The ESR and ESL of Example 7 of the solid electrolytic capacitor are smaller than those of Comparative Example 3. Insulator 310 contacts positive projecting portion 305, negative electrode coupler 325 extends along the side surface of negative electrode 303, and capacitor elements 301 are accommodated within negative electrode coupler 325 so that insulator 310 faces the edge of the side portion of negative electrode coupler 325. This structure locates negative electrode coupler 325 close to positive electrode 302, thereby reducing the ESR and ESL, i.e., impedance, of solid electrolytic capacitor 3001.

Solid electrolytic capacitor 3001 according to Embodiments 3 and 4 reduces the path of the current flowing therein, and accordingly, reduces the ESR and ESL, i.e., impedance, of solid electrolytic capacitor 3001. Thus, solid electrolytic capacitor 3001 is useful for various electronic devices and electric circuits that are used for, e.g. power supply lines for CPUs.

According to the embodiments, terms indicating the directions, such as "upper surface", "lower surface", "upward", and "directly above" indicate relative directions determined based on relative positions of components, such as capacitor elements, negative terminal, and positive terminals, of the solid electrolytic capacitor, and do not indicate absolute directions, such as a vertical direction.

What is claimed is:

1. A solid electrolytic capacitor comprising:
    a negative terminal;
    a first capacitor element coupled to the negative terminal;
    a second capacitor element provided on the first capacitor element;
    a third capacitor element provided on the second capacitor element;
    a fourth capacitor element provided on the third capacitor element;
    first and second positive terminals connected to the first to fourth capacitor elements; and
    a package resin covering the first to fourth capacitor elements, wherein
    each of the first to fourth capacitor elements has a first end and a second end opposite to the first end, and each of the first to fourth capacitor elements includes a negative electrode provided at the first end and a positive electrode provided at the second end,
    the negative electrode of the first capacitor element is coupled to an upper surface of the negative terminal,
    the negative electrode of the second capacitor element is bonded to an upper surface of the negative electrode of the first capacitor element,
    the negative electrode of the third capacitor element is bonded to an upper surface of the negative electrode of the second capacitor element,
    the negative electrode of the fourth capacitor element is bonded to an upper surface of the negative electrode of the third capacitor element,
    the positive electrodes of the first and fourth capacitor elements extend in a first direction from the respective negative electrodes of the first and fourth capacitor elements,
    the positive electrodes of the second and third capacitor elements extend in a second direction, opposite to the first direction, from the respective negative electrodes of the second and third capacitor elements,
    the first positive terminal is connected to the positive electrodes of the first and fourth capacitor elements, and
    the second positive terminal is connected to the positive electrodes of the second and third capacitor elements.

2. The solid electrolytic capacitor according to claim 1, further comprising a coupler provided between the first capacitor element and the negative terminal, wherein
    the negative terminal includes a negative mounting portion facing a lower surface of the negative electrode of the first capacitor element,
    the coupler is sandwiched between the negative electrode of the first capacitor element and the negative mounting portion, and electrically connects the negative electrode with the negative mounting portion, the coupler being bonded to an upper surface of the negative mounting portion, and
    the package resin has a portion provided on a lower surface of the negative mounting portion.

3. The solid electrolytic capacitor according to claim 2, wherein
    the negative mounting portion has an aperture provided therein,
    the coupler is bonded to the upper surface of the negative mounting portion so as to close the aperture, and
    the package resin has a portion provided in the aperture.

4. The solid electrolytic capacitor according to claim 3, wherein the aperture is located between the positive electrodes of the first and fourth capacitor elements and the positive electrodes of the second and third capacitor elements in the first and second directions.

5. The solid electrolytic capacitor according to claim 2, wherein
    the negative mounting portion has a plurality of apertures provided therein,
    the coupler is bonded to the upper surface of the negative mounting portion so as to close the plurality of apertures,
    the package resin has portions provided in the plurality of apertures, and
    the plurality of apertures are located symmetrically to each other with respect to an axis that passes through a center between the positive electrodes of the first and fourth capacitor elements and the positive electrodes of the second and third capacitor elements and that is perpendicular to the first and second directions.

6. The solid electrolytic capacitor according to claim 1, further comprising a negative electrode coupler extending along side surfaces of the negative electrodes and fixed to the negative terminals, wherein
    the positive electrode of each of the first to fourth capacitor elements includes a positive projecting portion that projects in a third direction from the negative electrode, the third direction being perpendicular to the first direction,
    each of the first to fourth capacitor elements further includes an insulator that contacts a portion of the positive projecting portion facing the negative electrode, and
    the insulator faces an edge of the negative electrode coupler in the first direction.

7. The solid electrolytic capacitor according to claim 1, wherein the first positive terminal includes a positive electrode coupler extending along side surfaces of the positive projecting portions of the first and fourth capacitor elements, the side surfaces being opposite to the insulators.

* * * * *